United States Patent
Kim et al.

(10) Patent No.: US 10,409,414 B2
(45) Date of Patent: Sep. 10, 2019

(54) TOUCH SENSING APPARATUS, TOUCH SENSING METHOD, TOUCH SENSING SYSTEM, AND DISPLAY SYSTEM USING THE SAME

(71) Applicant: SAMSUNG ELECTRONICS CO., LTD., Suwon-si, Gyeonggi-Do (KR)

(72) Inventors: Jin-Bong Kim, Yongin-si (KR); Yoon-Kyung Choi, Seoul (KR); Min-Sung Kim, Suwon-si (KR); Eung-Man Kim, Suwon-si (KR); Hwi-Taek Chung, Yongin-si (KR); Do-Kyung Kim, Yongin-si (KR); Young-Joo Lee, Uijeongbu-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 90 days.

(21) Appl. No.: 15/412,220

(22) Filed: Jan. 23, 2017

(65) Prior Publication Data
US 2017/0228084 A1    Aug. 10, 2017

(30) Foreign Application Priority Data
Feb. 4, 2016    (KR) .................. 10-2016-0014080

(51) Int. Cl.
G06F 3/041    (2006.01)
G06F 3/044    (2006.01)

(52) U.S. Cl.
CPC ............ *G06F 3/0416* (2013.01); *G06F 3/044* (2013.01); *G06F 3/0412* (2013.01); *G06F 2203/04107* (2013.01)

(58) Field of Classification Search
CPC ...... G06F 3/0416; G06F 3/044; G06F 3/0412; G06F 2203/04107
See application file for complete search history.

(56) References Cited

U.S. PATENT DOCUMENTS

| | | | |
|---|---|---|---|
| 6,429,843 B1 | 8/2002 | Zhang et al. | |
| 8,427,436 B2 | 4/2013 | Park et al. | |
| 8,842,093 B2 | 9/2014 | Magami et al. | |
| 9,046,954 B2 | 6/2015 | Kim et al. | |
| 9,122,348 B2 | 9/2015 | Kurokawa | |
| 2013/0141372 A1 | 6/2013 | Kang | |
| 2013/0314342 A1 | 11/2013 | Kim et al. | |
| 2015/0116261 A1* | 4/2015 | Ahn | G06F 3/0418 345/174 |
| 2015/0185913 A1 | 7/2015 | Han et al. | |
| 2015/0301667 A1* | 10/2015 | Yano | G06F 3/0412 345/173 |
| 2015/0309661 A1* | 10/2015 | Kim | G06F 3/0418 345/174 |
| 2016/0320886 A1* | 11/2016 | Kim | G06F 3/0412 |

* cited by examiner

*Primary Examiner* — Aneeta Yodichkas
(74) *Attorney, Agent, or Firm* — Volentine, Whitt & Francos, PLLC

(57) ABSTRACT

A touch sensing apparatus includes a plurality of touch sensors provided in a touch panel and a switching unit for transmitting sensing signals per column or row of the touch sensors through a single line to a touch controller.

20 Claims, 26 Drawing Sheets

TOUCH SENSING APPARATUS, TOUCH SENSING METHOD, TOUCH SENSING SYSTEM, AND DISPLAY SYSTEM USING THE SAME

CROSS-REFERENCE TO RELATED APPLICATION

This application claims the benefit of Korean Patent Application No. 10-2016-0014080, filed on Feb. 4, 2016, in the Korean Intellectual Property Office, the disclosure of which is incorporated herein in its entirety by reference.

BACKGROUND

The disclosure relates to a touch sensing apparatus and a touch sensing method of a touch panel, and more particularly, to a touch sensing apparatus, a touch sensing method, a touch sensing system, and a display system using the same.

A touch sensing apparatus is an input apparatus for receiving user input, which input is made using an object such as a finger or a touch pen in response to data shown on a screen of a display apparatus or the like. The touch sensing apparatus requires a number of touch sensors in proportion to the size of a touch panel. For example, each touch sensor requires a pad in a self-capacitance sensing scheme based on an in-cell structure. As such, the number of pins and the size of a touch sensor chip are greatly increased.

SUMMARY

The disclosure provides a touch sensing apparatus capable of reducing the number of pins and the size of a touch sensor chip.

The disclosure also provides a touch sensing method capable of reducing the number of pins and the size of a touch sensor chip.

The disclosure also provides a touch sensing system capable of reducing the number of pins and the size of a touch sensor chip.

The disclosure also provides a display system capable of reducing the number of pins and the size of a touch sensor chip.

According to an aspect of the disclosure, there is provided a touch sensing apparatus that includes a plurality of touch sensors provided in a touch panel. A switching unit transmits sensing signals per column or row of the touch sensors through a single line to a touch controller.

According to another aspect of the disclosure, there is provided a touch sensing method. The method includes generating, by a touch controller, a driving signal to be supplied to a plurality of touch sensors provided in a touch panel. A touch sensor is selected per column or row of the touch sensors. The driving signal is supplied through a first signal line to the selected touch sensor. A touch sensor per column or row of the touch sensors is selected, and a sensing signal of the selected touch sensor is transmitted according to the driving signal through a second signal line to the touch controller. A position of a touch input is determined based on an output according to the driving signal.

According to another aspect of the disclosure, there is provided a touch sensing system including a plurality of touch sensors provided as an electrode array structure in a touch panel. A touch controller generates a driving signal to be supplied to the touch sensors and detects a position of a touch input based on signals output from the touch sensors. A switching unit selects a touch sensor per column or row of the touch sensors and supplies the driving signal to the selected touch sensor or transmits a sensing signal of the selected touch sensor to the touch controller. The switching unit and the touch controller are connected to each other through two lines per column or row of the touch sensors.

According to another aspect of the disclosure, there is provided a display system having a display panel that includes gate lines, source lines, a plurality of pixels provided where the gate lines and the source lines cross each other, and touch sensors provided in the same layer as the pixels. A gate driver drives the gate lines, and a source driver drives the source lines. A touch controller generates a driving signal to be supplied to the touch sensors and detects a position of a touch input based on signals output from the touch sensors. A switching unit selects a touch sensor per column or row of the touch sensors and supplies the driving signal to the selected touch sensor or transmits a sensing signal of the selected touch sensor through one line to the touch controller per column or row of the touch sensors.

According to another aspect of the disclosure, there is provided a touch sensing apparatus that includes a plurality of touch sensors, arranged in rows and columns of a touch panel, and multiplexers. Each of the multiplexers receives an electrical sensing signal from each touch sensor arranged within one of the rows or columns, and each of the multiplexers transmits only one electrical sensing signal from the row or column of touch sensors at any time through a single communication line to a switch controller.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

The disclosure will now be described more fully with reference to the accompanying drawings, in which embodiments of the disclosure are shown.

Figure 1:
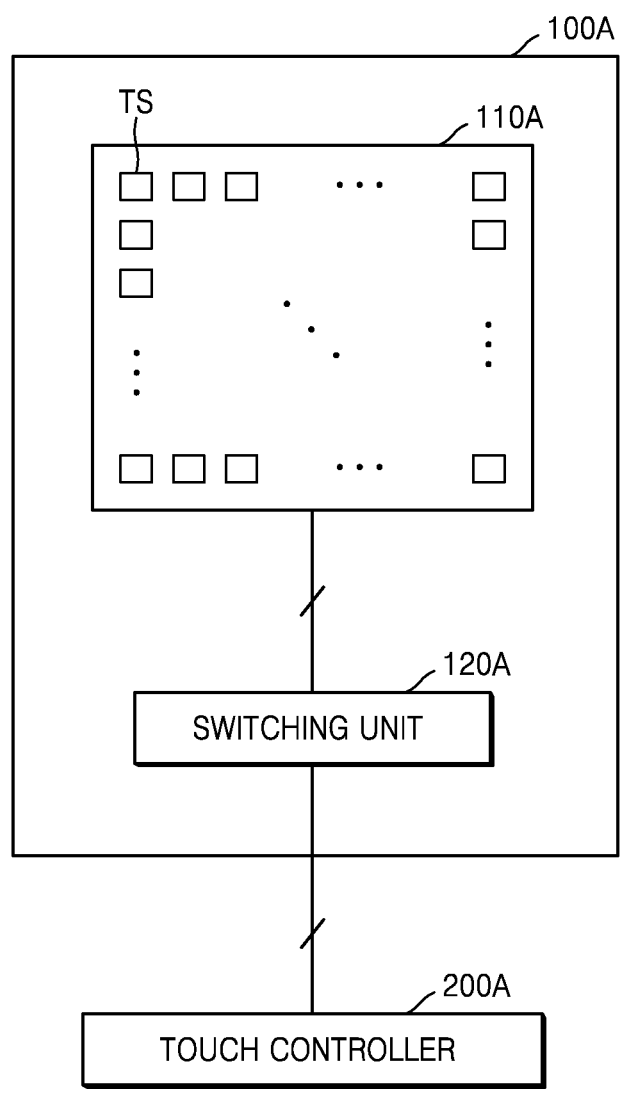
FIG. 1 shows the configuration of a touch sensing system according to an embodiment of the disclosure.

FIG. 1 shows the configuration of a touch sensing system 1000A according to an embodiment of the disclosure.

Referring to FIG. 1, the touch sensing system 1000A includes a touch sensing apparatus 100A and a touch controller 200A. Herein, the touch sensing apparatus 100A includes a touch panel 110A and a switching unit 120A.

The touch panel 110A includes a plurality of touch sensors TS. For example, the touch panel 110A may include the touch sensors TS provided in a plurality of row directions and a plurality of column directions.

The touch sensors TS may be implemented as sensing electrodes provided in the touch panel 110A. For example, the touch sensors TS may be provided as an electrode array structure for sensing a position of a touch input based on a self-capacitance sensing scheme. As another example, the touch sensors TS may be provided as an electrode array structure for sensing a position of a touch input based on a mutual-capacitance sensing scheme. A description thereof will be given below with reference to FIGS. 6 to 8.

For example, the touch sensors TS may be in-cell type touch sensors provided in a display panel. As another example, the touch sensors TS may be on-cell type touch sensors provided on the display panel. A description thereof will be given below with reference to FIGS. 4 and 5.

The switching unit 120A has a line structure and a switching circuit corresponding to the touch sensors TS provided as an electrode array structure for sensing a position of a touch input based on any one of a self-capacitance sensing scheme and a mutual-capacitance sensing scheme.

The switching unit 120A includes a circuit for transmitting sensing signals per column or row of the touch sensors TS through a single line to the touch controller 200A. For example, the switching unit 120A may include transistors individually connected to the touch sensors TS, first terminals of the transistors may be individually connected to the touch sensors TS, second terminals of the transistors may be connected to one pad per column or row of the touch sensors TS, the pad may be provided in an integrated circuit including the touch controller 200A, and gate terminals of the transistors may receive selection signals from the touch controller 200A. For example, the selection signals generated by the touch controller 200A may include column selection signals or row selection signals. The transistors included in the switching unit 120A may be configured as thin film transistors.

For example, lines for supplying a driving signal from the touch controller 200A to the touch sensors TS may be added to the switching unit 120A. In this case, the switching unit 120A may further include a switching circuit for supplying the driving signal per column or row of the touch sensors TS through the added lines.

For example, the switching unit 120A may be designed to be provided in the touch panel 110A.

The touch controller 200A may include hardware and software for generating a driving signal to be supplied to the touch sensors TS, and for performing signal processing to detect a position of a touch input based on signals sensed from the touch sensors TS. In addition, the touch controller 200A may include hardware and software for generating selection signals to be supplied to the switching unit 120A.

Figure 2:
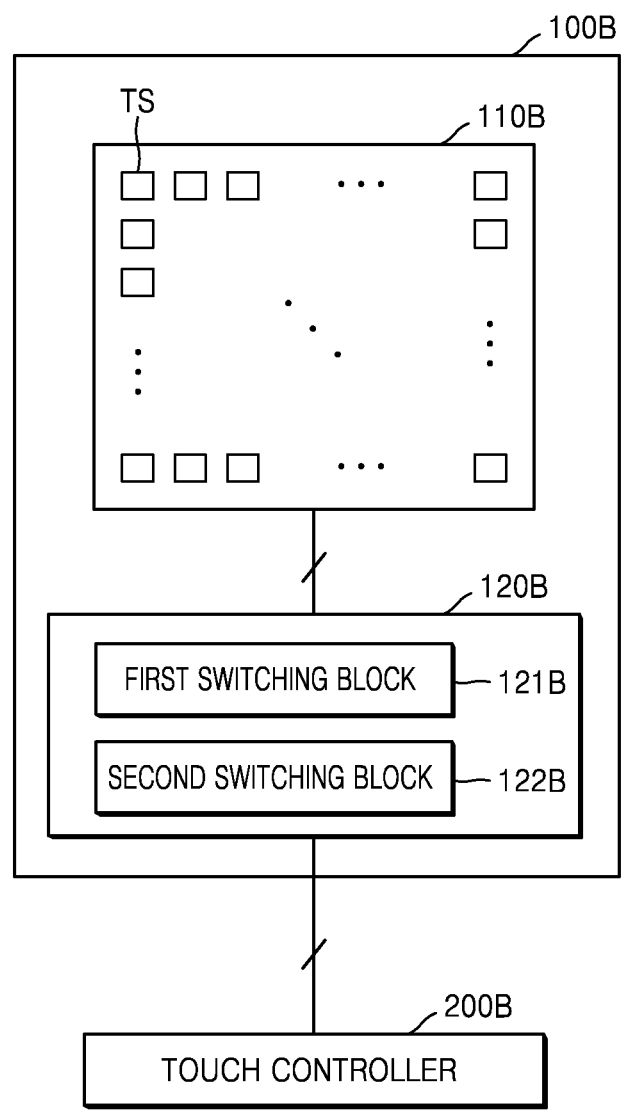
FIG. 2 shows the configuration of a touch sensing system according to another embodiment of the disclosure.

FIG. 2 shows the configuration of a touch sensing system 1000B according to another embodiment of the disclosure.

Referring to FIG. 2, the touch sensing system 1000B includes a touch sensing apparatus 100B and a touch controller 200B. Herein, the touch sensing apparatus 100B includes a touch panel 110B and a switching unit 120B. The switching unit 120B includes a first switching block 121B and a second switching block 122B.

Although the touch sensing system 1000A illustrated in FIG. 1 uses any one of a self-capacitance sensing scheme and a mutual-capacitance sensing scheme, the touch sensing system 1000B illustrated in FIG. 2 is designed to use both a self-capacitance sensing scheme and a mutual-capacitance sensing scheme.

The touch panel 110B includes a plurality of touch sensors TS. The touch sensors TS are provided as an electrode array structure capable of sensing a position of a touch input based on each of a self-capacitance sensing scheme and a mutual-capacitance sensing scheme. A description thereof will be given below with reference to FIGS. 6 to 8.

The first switching block 121B has a line structure and a switching circuit corresponding to the touch sensors TS provided as an electrode array structure for sensing a position of a touch input based on a self-capacitance sensing scheme. The second switching block 122B has a line structure and a switching circuit corresponding to the touch sensors TS provided as an electrode array structure for sensing a position of a touch input based on a mutual-capacitance sensing scheme.

The first switching block 121B includes a circuit for transmitting sensing signals per column or row of the touch sensors TS through a single line to the touch controller 200B based on a self-capacitance sensing scheme. For example, the first switching block 121B may include transistors individually connected to the touch sensors TS, first terminals of the transistors may be individually connected to the touch sensors TS, second terminals of the transistors may be connected to one pad per column or row of the touch sensors TS, the pad may be provided in an integrated circuit including the touch controller 200B, and gate terminals of the transistors may receive selection signals from the touch controller 200B. For example, the selection signals generated by the touch controller 200B may include column selection signals or row selection signals. The transistors included in the first switching block 121B may be configured as thin film transistors.

For example, lines for supplying a driving signal from the touch controller 200B to the touch sensors TS based on a self-capacitance sensing scheme may be added to the first switching block 121B. In this case, the first switching block 121B may further include a switching circuit for supplying the driving signal per column or row of the touch sensors TS through the added lines. For example, the switching circuit of the first switching block 121B may be designed to supply a driving signal of a direct current (DC) voltage to the touch sensors TS other than the touch sensors TS whose sensing signals are transmitted to the touch controller 200B.

The second switching block 122B includes a circuit for transmitting sensing signals per column or row of the touch sensors TS through a single line to the touch controller 200B based on a mutual-capacitance sensing scheme. For example, the second switching block 122B may include transistors individually connected to the touch sensors TS, first terminals of the transistors may be individually connected to the touch sensors TS, second terminals of the transistors may be connected to one pad per column or row of the touch sensors TS, the pad may be provided in an integrated circuit including the touch controller 200B, and gate terminals of the transistors may receive selection signals from the touch controller 200B. For example, the selection signals generated by the touch controller 200B may include column selection signals or row selection signals. The transistors included in the second switching block 122B may be configured as thin film transistors.

For example, lines for supplying a driving signal from the touch controller 200B to the touch sensors TS based on a mutual-capacitance sensing scheme may be added to the second switching block 122B. In this case, the second switching block 122B may further include a switching circuit for supplying the driving signal per column or row of the touch sensors TS through the added lines. For example, the switching circuit of the second switching block 122B may be designed to supply a driving signal to the touch sensors TS of a row or column adjacent to the touch sensors TS, the sensing signals of which are output.

For example, the switching unit 120B may be designed to be provided in the touch panel 110B.

The touch controller 200B may include hardware and software for generating a driving signal to be supplied to the touch sensors TS based on any one of a self-capacitance sensing scheme and a mutual-capacitance sensing scheme according to a selected mode, and for performing signal processing to detect a position of a touch input based on signals output from the touch sensors TS. In addition, the touch controller 200B may include hardware and software for generating selection signals to be supplied to the switching unit 120B.

Figure 3:
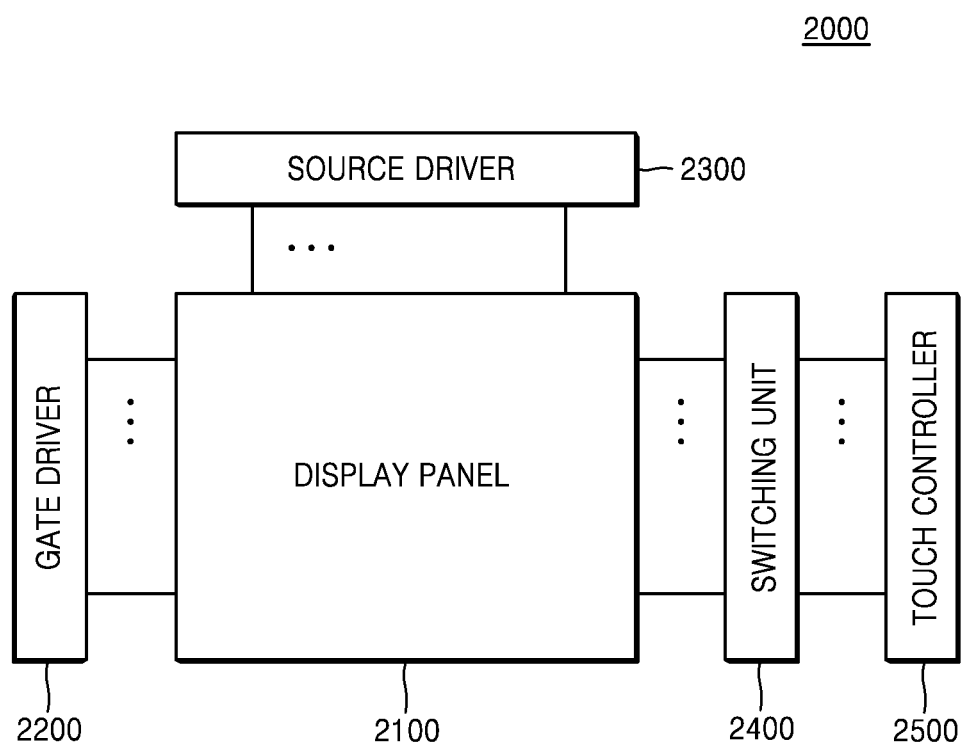
FIG. 3 shows the configuration of a display system according to an embodiment of the disclosure.

FIG. 3 shows the configuration of a display system 2000 according to an embodiment of the disclosure.

Referring to FIG. 3, the display system 2000 includes a display panel 2100, a gate driver 2200, a source driver 2300, a switching unit 2400, and a touch controller 2500.

For example, the display panel 2100 includes gate lines, source lines, and a plurality of pixels provided where the gate lines and the source lines cross each other, and has a structure in which a plurality of touch sensors are provided in the same layer as the pixels. These touch sensors are called in-cell type touch sensors. For example, the pixels and the touch sensors provided in the same layer of the display panel 2100 may be driven based on a time division scheme.

As another example, the display panel 2100 may include gate lines, source lines, and a plurality of pixels provided where the gate lines and the source lines cross each other, and may be designed in such a manner that a plurality of touch sensors are provided in a different layer from the pixels. These touch sensors are called on-cell type touch sensors.

For example, in the display panel 2100, the touch sensors may be provided as an electrode array structure for sensing a position of a touch input based on a self-capacitance sensing scheme or a mutual-capacitance sensing scheme.

The gate driver 2200 supplies a gate pulse sequentially to the gate lines of the display panel 2100 to drive the gate lines. As such, the gate lines are sequentially activated.

The source driver 2300 receives input image data for displaying pixels of one row, and supplies a gradation voltage corresponding to the input image data of every column, to source lines.

The gate lines activated due to the gate pulse display an image according to the gradation voltage supplied by the source driver 2300 to the source lines.

The switching unit 2400 includes a circuit for transmitting sensing signals per column or row of the touch sensors provided in the display panel 2100, through a single line to the touch controller 2500. Lines for supplying a driving signal from the touch controller 2500 to the touch sensors may be added to the switching unit 2400. In this case, the switching unit 2400 may further include a switching circuit for supplying the driving signal per column or row of the touch sensors through the added lines.

The touch controller 2500 may include hardware and software for generating a driving signal to be supplied to the touch sensors provided in the display panel 2100, and for performing signal processing to detect a position of a touch input based on signals output from the touch sensors.

The switching unit 2400 and the touch controller 2500 may use the switching unit 120A or 120B and the touch controller 200A or 200B illustrated in FIG. 1 or 2, respectively. For example, the switching unit 2400 may be designed to be provided in the display panel 2100.

Figure 4:
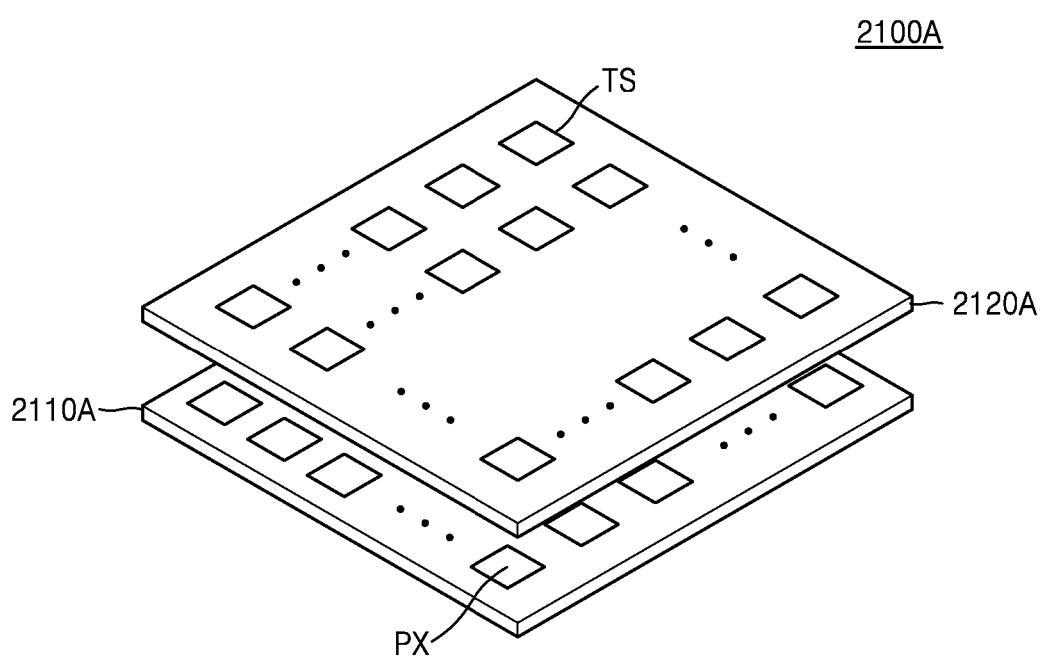
FIG. 4 is a diagram for describing the structure of on-cell type touch sensors provided on a display panel in FIGS. 1 to 3.

FIG. 4 is a diagram for describing the structure of on-cell type touch sensors TS provided on a display panel 2100A in FIGS. 1 to 3, and FIG. 5 is a diagram for describing the structure of in-cell type touch sensors TS provided in a display panel 2100B in FIGS. 1 to 3.

Referring to FIG. 4, the display panel 2100A includes a first layer 2110A including an array of pixels PX, and a second layer 2120A including the touch sensors TS. That is, the display panel 2100A has a structure in which the touch sensors TS are provided in a different layer from the array of the pixels PX.

Figure 5:
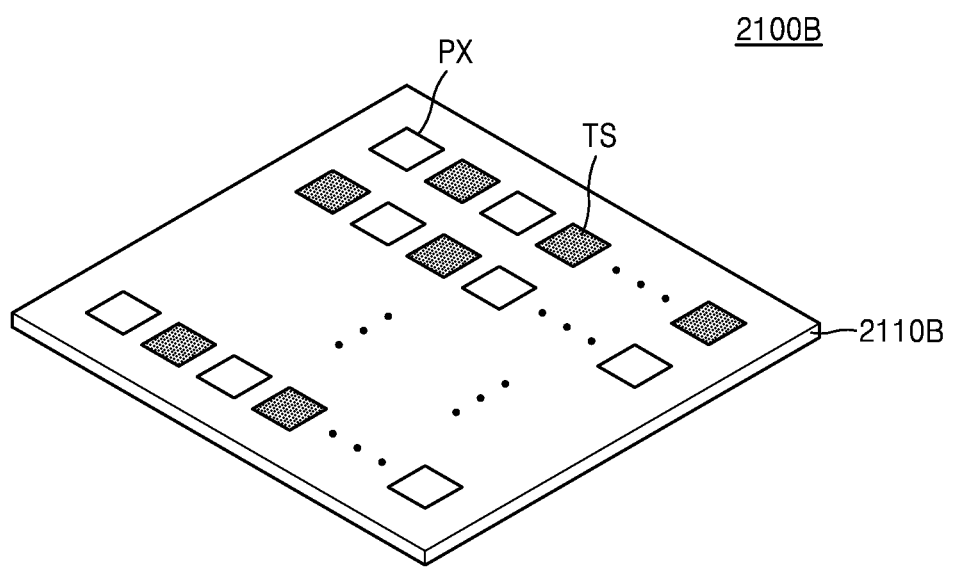
FIG. 5 is a diagram for describing the structure of in-cell type touch sensors provided in a display panel in FIGS. 1 to 3.

Referring to FIG. 5, in the display panel 2100B, an array of pixels PX and the touch sensors TS are provided in the same layer 2110B. Although equal numbers of pixels and touch sensors are alternately provided in FIG. 5 for convenience of explanation, the number of touch sensors is less than the number of pixels in actual cases.

Figure 6:
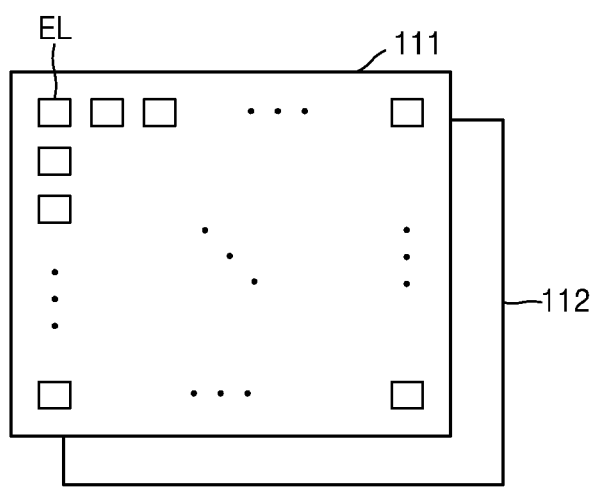
FIG. 6 is a diagram for describing the structure of a touch panel based on a self-capacitance sensing scheme or a mutual-capacitance sensing scheme in FIGS. 1 to 3.

FIG. 6 is a diagram for describing the structure of a touch panel 110C based on a self-capacitance sensing scheme or a mutual-capacitance sensing scheme in FIGS. 1 to 3.

Referring to FIG. 6, the touch panel 110C includes a first electrode array 111 and a second electrode 112.

A plurality of first electrodes EL included in the first electrode array 111, and the second electrode 112 may be implemented using a transparent conductive material such as indium tin oxide (ITO), indium zinc oxide (IZO), or indium tin zinc oxide (ITZO).

Although the first electrode array 111 and the second electrode 112 are spatially spaced apart from each other in FIG. 6 for a better understanding of an embodiment of the disclosure, the first electrode array 111 and the second electrode 112 may be provided adjacent to each other by providing, for example, thin insulating materials therebetween. In addition, the first electrodes EL included in the first electrode array 111 are exaggerated in FIG. 6 and, according to embodiments, the touch panel 110C may include smaller and a larger number of first electrodes.

The first electrode array 111 may include a plurality of first electrodes EL, and the first electrodes EL may be insulated from each other within the first electrode array 111. The first electrodes EL included in the first electrode array 111 may be individually connected to a plurality of lines exposed to the outside of the first electrode array 111, and the lines may be connected to the switching unit 120A or 120B. Although each of the first electrodes EL has a rectangular shape as an example in FIG. 6, the first electrodes EL may be arranged in an array with a shape different from the rectangular shape.

The second electrode 112 may have a plate shape as illustrated in FIG. 6, and may be spaced apart from and stacked over the first electrode array 111. A constant voltage VDC may be applied to the second electrode 112. For example, a ground voltage may be applied to the second electrode 112.

According to an embodiment of the disclosure, the touch panel 110C may operate based on a self-capacitance sensing scheme or a mutual-capacitance sensing scheme. In a self-capacitance sensing scheme, the touch panel 110C may sense touch based on a capacitance variation between the first electrodes EL included in the first electrode array 111, and the second electrode 112. In this case, the first electrodes EL contacting the second electrode 112 may serve as touch sensors.

In a mutual-capacitance sensing scheme, the touch panel 110C may sense touch based on a capacitance variation between the first electrodes EL included in the first electrode array 111. In this case, the first electrodes EL may serve as touch sensors irrespective of the second electrode 112.

Figure 7:
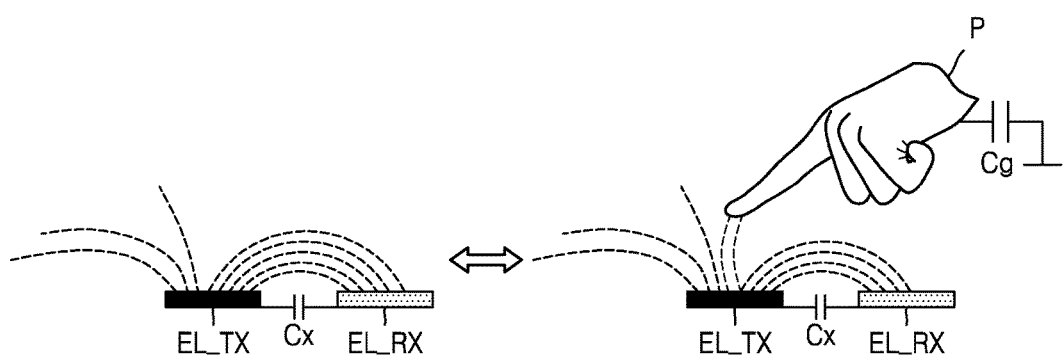
FIG. 7 is a diagram for describing operation of touch sensors based on a mutual-capacitance sensing scheme in FIG. 6.

FIG. 7 is a diagram for describing operation of touch sensors based on a mutual-capacitance sensing scheme in FIG. 6.

In a mutual-capacitance sensing scheme, each of the first electrodes EL included in the first electrode array 111 illustrated in FIG. 6 may operate as a sensing electrode EL_RX or a driving electrode EL_TX. For example, every two adjacent electrodes among the first electrodes EL may operate as the sensing electrode EL_RX and the driving electrode EL_TX. The sensing electrode EL_RX may be an electrode for sensing a variation generated due to touch of a pointer P, and the driving electrode EL_TX may be an electrode for receiving a signal of a specific frequency. As illustrated in FIG. 7, the sensing electrode EL_RX and the driving electrode EL_TX may be spaced apart from each other by providing, for example, an insulating material therebetween, and a capacitance Cx may be generated between the sensing electrode EL_RX and the driving electrode EL_TX. Due to an electrical signal applied to the driving electrode EL_TX, an electric field may be generated between the driving electrode EL_TX and the sensing electrode EL_RX as indicated by dashed lines in FIG. 7.

As illustrated in a right part of FIG. 7, when touch is generated by the pointer P, the electric field between the driving electrode EL_TX and the sensing electrode EL_RX may vary due to a capacitance Cg of the pointer P. The position of a touch input may be determined based on the variation in the capacitance Cx between the driving electrode EL_TX and the sensing electrode EL_RX.

Figure 8:
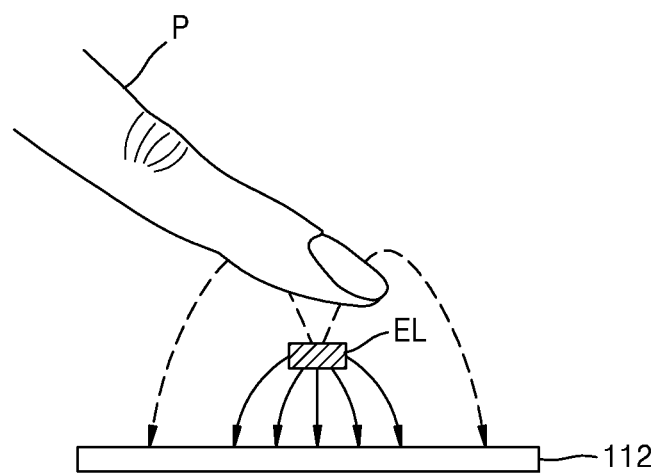
FIG. 8 is a diagram for describing operation of touch sensors based on a self-capacitance sensing scheme in FIG. 6.

FIG. 8 is a diagram for describing operation of touch sensors based on a self-capacitance sensing scheme in FIG. 6.

In a self-capacitance sensing scheme, each of the first electrodes EL included in the first electrode array 111 illustrated in FIG. 6 may operate as a driving electrode and a sensing electrode. A driving signal may be applied to the first electrodes EL and sensing signals may be received from the first electrodes EL. For example, when touch is generated by the pointer P, an electric field between the first electrode EL of the first electrode array 111, and the second electrode 112 may vary. The position of a touch input may be determined based on the variation in a capacitance between the first electrode EL and the second electrode 112.

Figure 9:
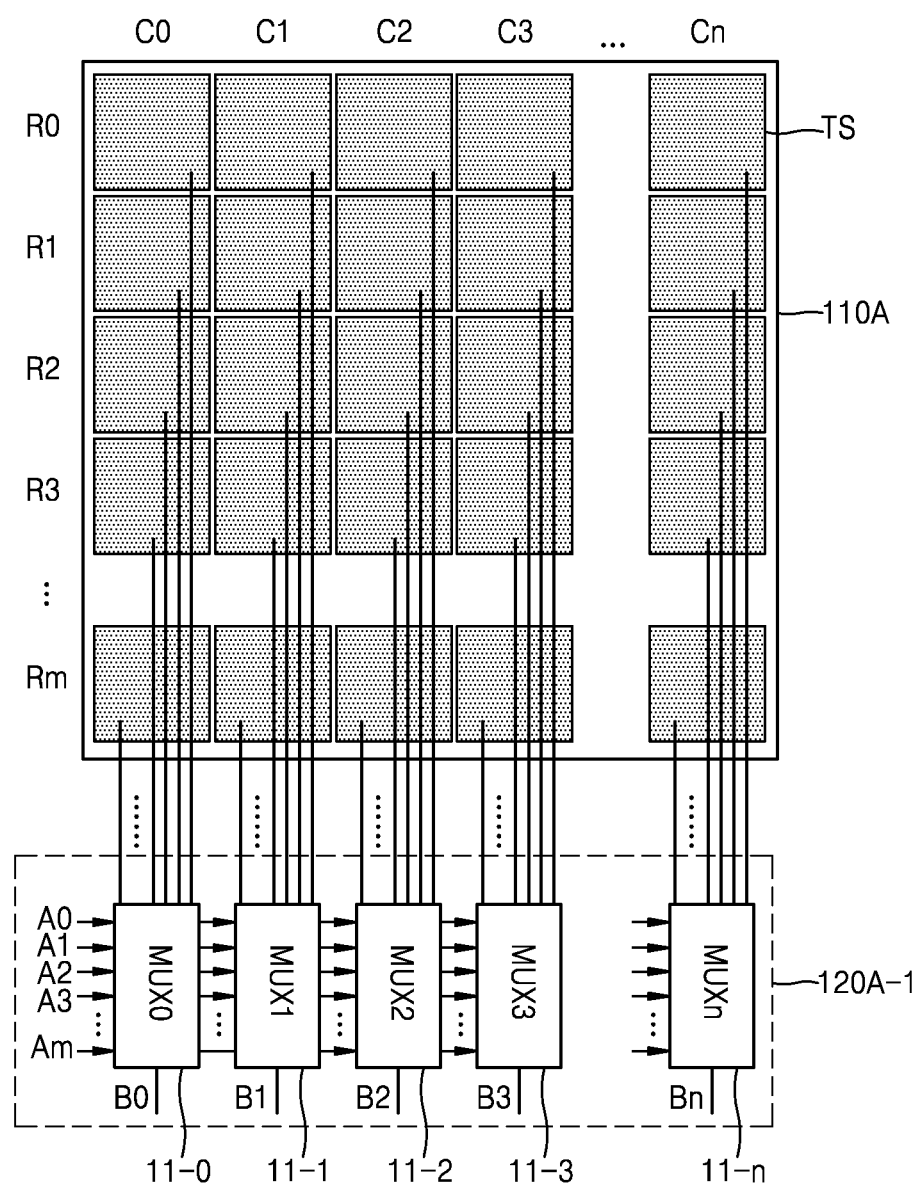
FIG. 9 is a diagram for describing an example of a connection structure of path patterns between a touch panel and a switching unit in FIG. 1.

FIG. 9 is a diagram for describing an example of a connection structure of path patterns between a touch panel 110A and a switching unit 120A-1 in FIG. 1.

The touch panel 110A may include a plurality of touch sensors TS arranged in m+1 rows R0-Rm (m is an integer equal to or greater than 1) and n+1 columns C0-Cn (n is an integer equal to or greater than 1).

The switching unit 120A-1 may include n+1 multiplexers 11-0 to 11-*n* corresponding to the number of the columns of the touch sensors TS provided in the touch panel 110A.

Each of the multiplexers 11-0 to 11-*n* has a circuit configuration for transmitting sensing signals of the touch sensors TS per column through a single line to the touch controller 200A.

Specifically, input terminals of the multiplexer 11-0 are individually connected to m+1 touch sensors TS provided in a first column C0 of the touch panel 110A. The multiplexer 11-0 selects one of the input terminals based on address signals A0 to Am, and outputs a sensing signal received from the selected input terminal, to an output terminal B0. The output of the multiplexer 11-0 is transmitted through one line to the touch controller 200A.

Input terminals of the multiplexer 11-1 are individually connected to m+1 touch sensors TS provided in a second column C1 of the touch panel 110A. The multiplexer 11-1 selects one of the input terminals based on the address signals A0 to Am, and outputs a sensing signal received from the selected input terminal, to an output terminal B1. The output of the multiplexer 11-1 is transmitted through one line to the touch controller 200A.

In this manner, input terminals of the multiplexer 11-n are individually connected to m+1 touch sensors TS provided in an (n+1)-th column Cn of the touch panel 110A. The multiplexer 11-n selects one of the input terminals based on the address signals A0 to Am, and outputs a sensing signal received from the selected input terminal, to an output terminal Bn. The output of the multiplexer 11-n is transmitted through one line to the touch controller 200A.

For example, when the touch panel 110C illustrated in FIG. 6 is used, the first electrodes EL included in the first electrode array 111 may be connected to the input terminals of the multiplexers 11-0 to 11-n.

Figure 10:
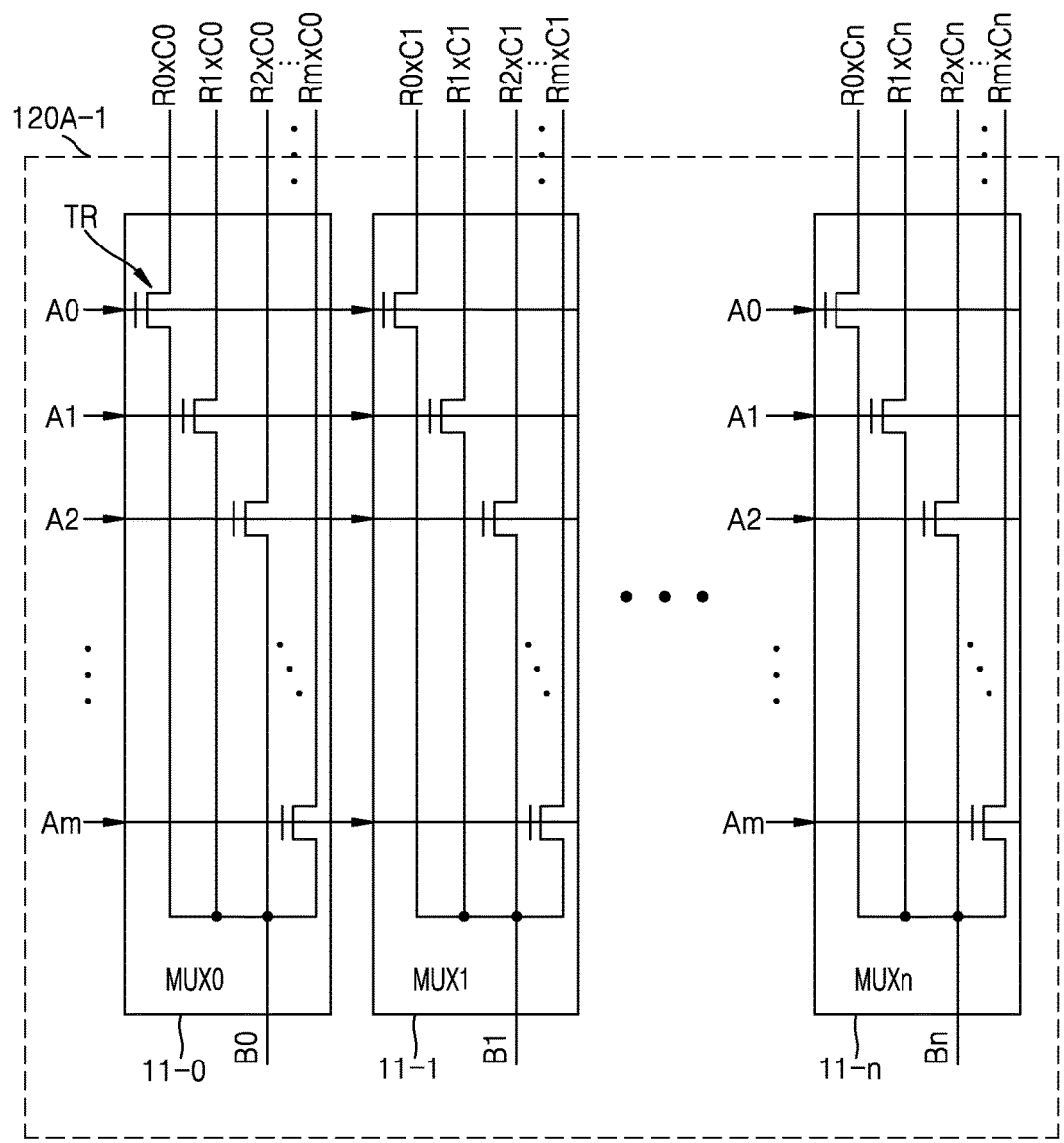
FIG. 10 is a diagram showing an example of a detailed configuration of multiplexers included in the switching unit illustrated in FIG. 9.

FIG. 10 is a diagram showing an example of a detailed configuration of the multiplexers 11-0 to 11-n included in the switching unit 120A-1 illustrated in FIG. 9.

Each of the multiplexers 11-0 to 11-n includes transistors TR individually connected to the touch sensors TS, first terminals of the transistors TR are individually connected to the touch sensors TS, and second terminals of the transistors TR are connected to an output terminal. Gate terminals of the transistors TR receive the address signals A0 to Am. Herein, the address signals A0 to Am are row selection signals.

Specifically, first terminals of the transistors TR included in the multiplexer 11-0 are individually connected to the m+1 touch sensors TS provided in the first column C0 of the touch panel 110A. That is, in the multiplexer 11-0, the first terminal of the transistor TR having received the address signal A0 through the gate terminal thereof is connected to the touch sensor TS provided in a first row R0 of the first column C0 (R0×C0) of the touch panel 110A, and the second terminal thereof is connected to the output terminal B0 of the multiplexer 11-0. In the multiplexer 11-0, the first terminal of the transistor TR having received the address signal A1 through the gate terminal thereof is connected to the touch sensor TS provided in a second row R1 of the first column C0 (R1×C0) of the touch panel 110A, and the second terminal thereof is connected to the output terminal B0 of the multiplexer 11-0. In this manner, in the multiplexer 11-0, the first terminal of the transistor TR having received the address signal Am through the gate terminal thereof is connected to the touch sensor TS provided in an (m+1)-th row Rm of the first column C0 (Rm×C0) of the touch panel 110A, and the second terminal thereof is connected to the output terminal B0 of the multiplexer 11-0.

Furthermore, first terminals of the transistors TR included in the multiplexer 11-1 are individually connected to the m+1 touch sensors TS provided in the second column C1 of the touch panel 110A. That is, in the multiplexer 11-1, the first terminal of the transistor TR having received the address signal A0 through the gate terminal thereof is connected to the touch sensor TS provided in the first row R0 of the second column C1 (R0×C1) of the touch panel 110A, and the second terminal thereof is connected to the output terminal B1 of the multiplexer 11-1. In the multiplexer 11-1, the first terminal of the transistor TR having received the address signal A1 through the gate terminal thereof is connected to the touch sensor TS provided in the second row R1 of the second column C1 (R1×C1) of the touch panel 110A, and the second terminal thereof is connected to the output terminal B1 of the multiplexer 11-1. In this manner, in the multiplexer 11-1, the first terminal of the transistor TR having received the address signal Am through the gate terminal thereof is connected to the touch sensor TS provided in the (m+1)-th row Rm of the second column C1 (Rm×C1) of the touch panel 110A, and the second terminal thereof is connected to the output terminal B1 of the multiplexer 11-1.

In this manner, first terminals of the transistors TR included in the multiplexer 11-n are individually connected to the m+1 touch sensors TS provided in the (n+1)-th column Cn of the touch panel 110A. That is, in the multiplexer 11-n, the first terminal of the transistor TR having received the address signal A0 through the gate terminal thereof is connected to the touch sensor TS provided in the first row R0 of the (n+1)-th column Cn (R0×Cn) of the touch panel 110A, and the second terminal thereof is connected to the output terminal Bn of the multiplexer 11-n. In the multiplexer 11-n, the first terminal of the transistor TR having received the address signal A1 through the gate terminal thereof is connected to the touch sensor TS provided in the second row R1 of the (n+1)-th column Cn (R1×Cn) of the touch panel 110A, and the second terminal thereof is connected to the output terminal Bn of the multiplexer 11-n. In this manner, in the multiplexer 11-n, the first terminal of the transistor TR having received the address signal Am through the gate terminal thereof is connected to the touch sensor TS provided in the (m+1)-th row Rm of the (n+1)-th column Cn (Rm×Cn) of the touch panel 110A, and the second terminal thereof is connected to the output terminal Bn of the multiplexer 11-n.

For example, the transistors TR included in the multiplexers 11-0 to 11-n may be implemented as thin film transistors.

Referring to FIGS. 1 and 10, n+1 lines are required between the switching unit 120A-1 and the touch controller 200A to transmit sensing signals of m×n touch sensors TS of the touch panel 110A to the touch controller 200A. As such, the number of lines between the switching unit 120A-1 and the touch controller 200A may be reduced.

Figure 11:
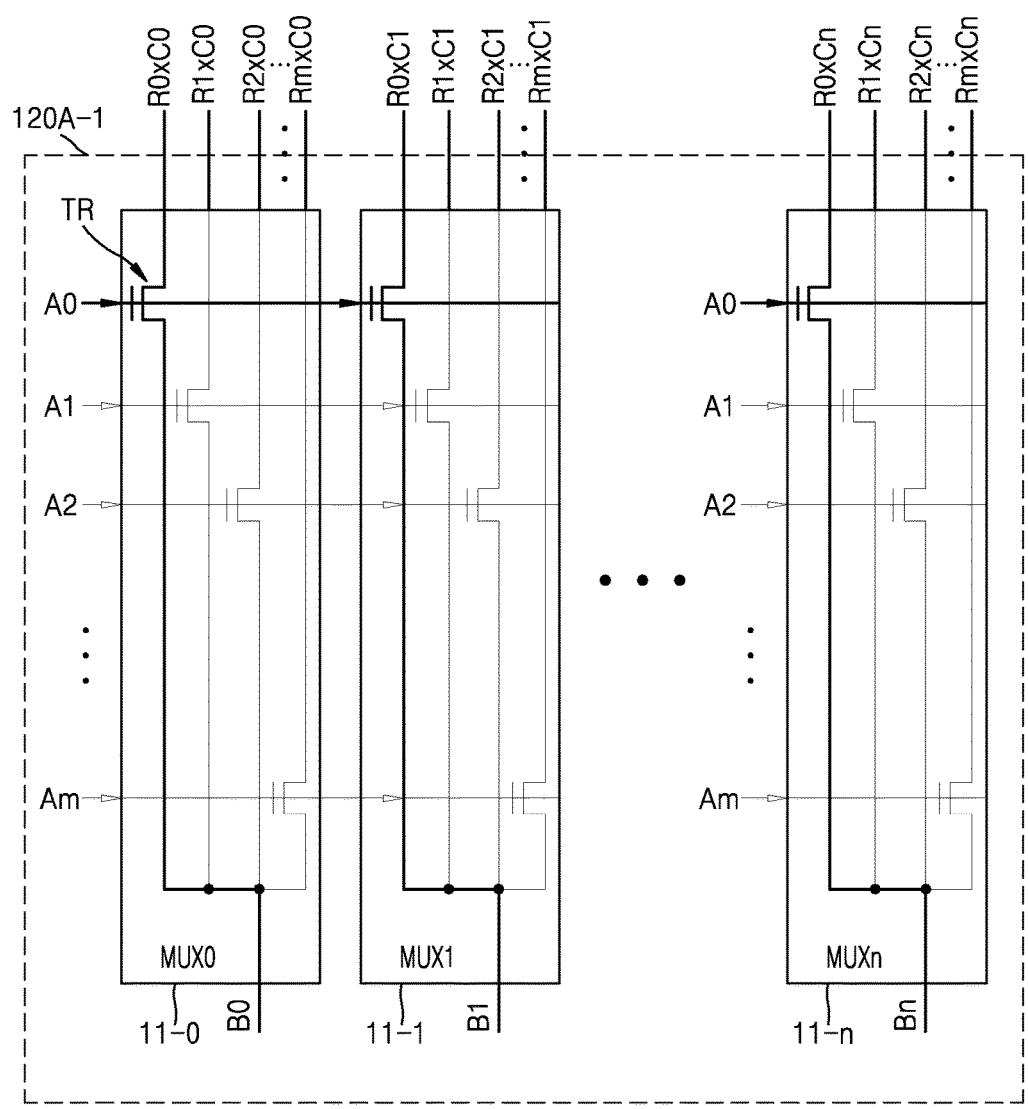
FIG. 11 is a diagram for describing operations of the multiplexers illustrated in FIG. 10.

FIG. 11 is a diagram for describing operations of the multiplexers 11-0 to 11-n illustrated in FIG. 10.

FIG. 11 shows operations of the multiplexers 11-0 to 11-n in a case when the address signal A0 among the address signals A0 to Am is in a selection logic state and the other address signals A1 to Am are in a non-selection logic state.

Since the address signal A0 is in a selection logic state, only the transistors TR having received the address signal A0 through the gate terminals thereof are turned on and the other transistors TR are turned off.

As such, the multiplexer 11-0 selects a sensing signal of the touch sensor TS provided in the first row R0 of the first column C0 (R0×C0) among the m+1 touch sensors TS provided in the first column C0 of the touch panel 110A, and transmits the selected sensing signal of the touch sensor TS of R0×C0 through the output terminal B0 to the touch controller 200A.

The multiplexer 11-1 selects a sensing signal of the touch sensor TS provided in the first row R0 of the second column C1 (R0×C1) among the m+1 touch sensors TS provided in the second column C1 of the touch panel 110A, and transmits the selected sensing signal of the touch sensor TS of R0×C1 through the output terminal B1 to the touch controller 200A.

In this manner, the multiplexer 11-n selects a sensing signal of the touch sensor TS provided in the first row R0 of the (n+1)-th column Cn (R0×Cn) among the m+1 touch sensors TS provided in the (n+1)-th column Cn of the touch panel 110A, and transmits the selected sensing signal of the touch sensor TS of R0×Cn through the output terminal Bn to the touch controller 200A.

As such, when the address signal A0 among the address signals A0 to Am applied to the switching unit 120A-1 is in a selection logic state and the other address signals A1 to Am are in a non-selection logic state, the sensing signals of the touch sensors TS provided in the first row R0 of the touch panel 110A are individually transmitted through the output terminals B0 to Bn to the touch controller 200A.

In this manner, when the address signal Aj among the address signals A0 to Am applied to the switching unit 120A-1 is in a selection logic state and the other address signals are in a non-selection logic state, the sensing signals of the touch sensors TS provided in the (j+1)-th row Rj of the touch panel 110A may be individually transmitted through the output terminals B0 to Bn to the touch controller 200A.

Figure 12:
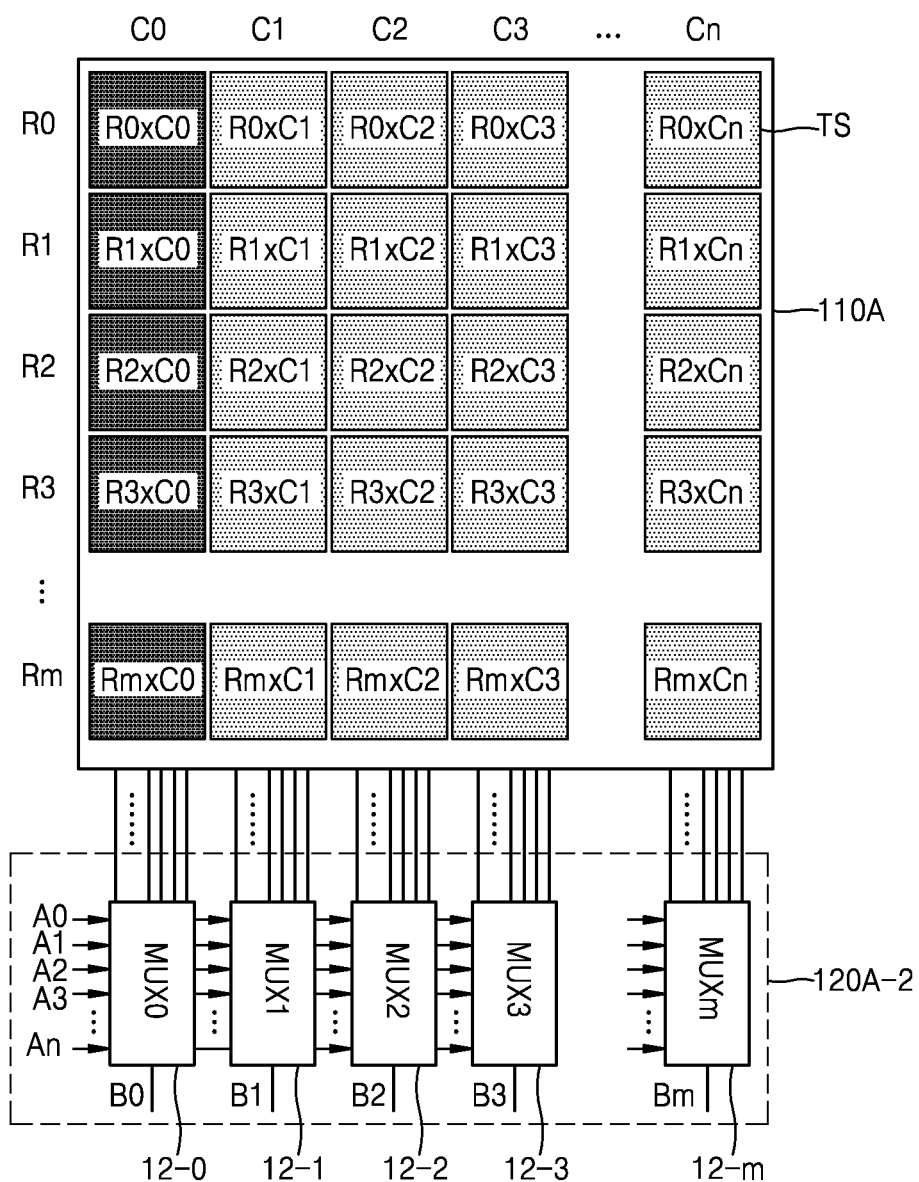
FIG. 12 is a diagram for describing another example of a connection structure of path patterns between a touch panel and a switching unit in FIG. 1.

FIG. 12 is a diagram for describing another example of a connection structure of path patterns between a touch panel 110A and a switching unit 120A-2 in FIG. 1.

The switching unit 120A-2 may include m+1 multiplexers 12-0 to 12-m corresponding to the number of the rows of the touch sensors TS provided in the touch panel 110A.

Each of the multiplexers 12-0 to 12-m has a circuit configuration for transmitting sensing signals of the touch sensors TS per row through a single line to the touch controller 200A.

Specifically, input terminals of the multiplexer 12-0 are individually connected to n+1 touch sensors TS provided in a first row R0 of the touch panel 110A. The multiplexer 12-0 selects one of the input terminals based on address signals A0 to An, and outputs a sensing signal received from the selected input terminal, to an output terminal B0. The output of the multiplexer 12-0 is transmitted through one line to the touch controller 200A.

Input terminals of the multiplexer 12-1 are individually connected to n+1 touch sensors TS provided in a second row R1 of the touch panel 110A. The multiplexer 12-1 selects one of the input terminals based on the address signals A0 to An, and outputs a sensing signal received from the selected input terminal, to an output terminal B1. The output of the multiplexer 12-1 is transmitted through one line to the touch controller 200A.

In this manner, input terminals of the multiplexer 12-m are individually connected to n+1 touch sensors TS provided in an (m+1)-th row Rm of the touch panel 110A. The multiplexer 12-m selects one of the input terminals based on the address signals A0 to An, and outputs a sensing signal received from the selected input terminal, to an output terminal Bm. The output of the multiplexer 12-m is transmitted through one line to the touch controller 200A.

For example, when the touch panel 110C illustrated in FIG. 6 is used, the first electrodes EL included in the first electrode array 111 may be connected to the input terminals of the multiplexers 12-0 to 12-m.

Figure 13:
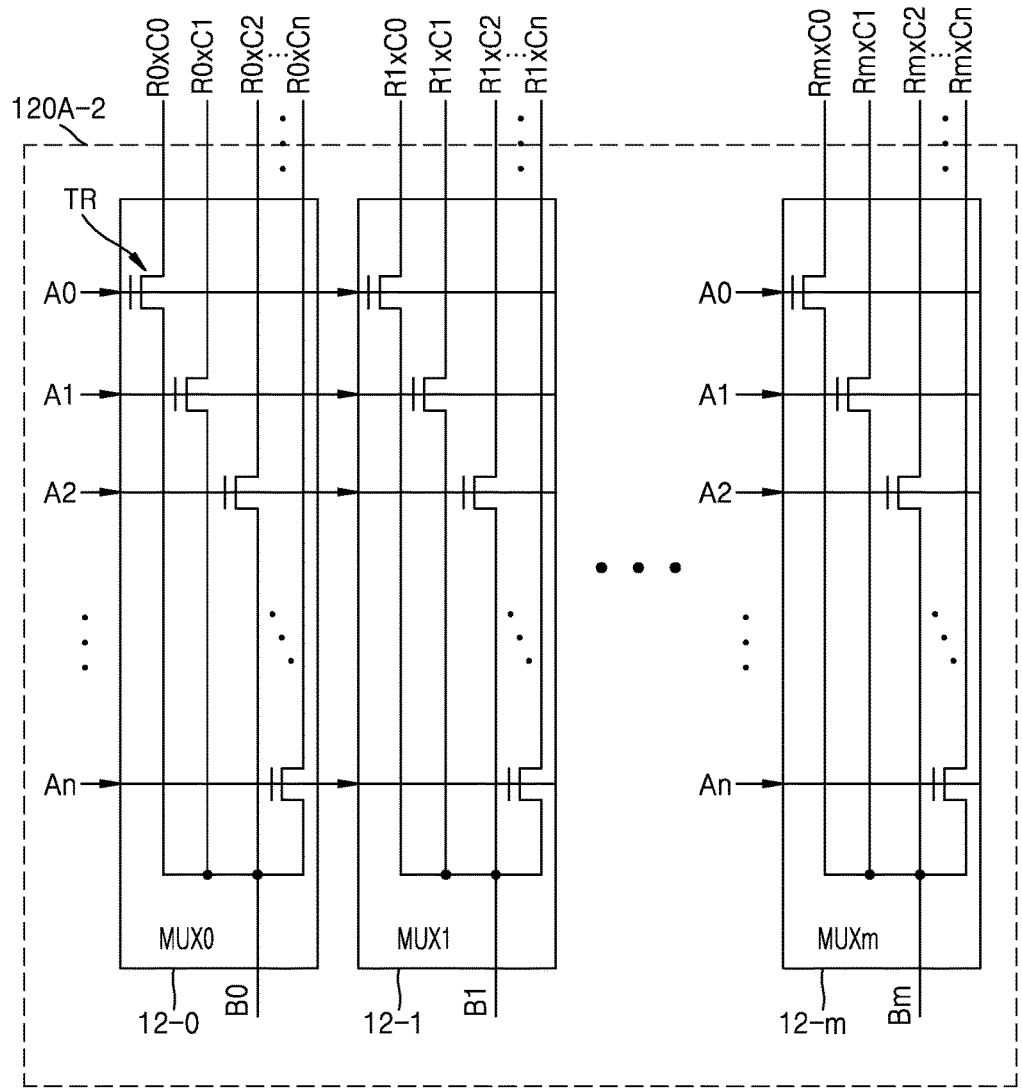
FIG. 13 is a diagram showing an example of a detailed configuration of multiplexers included in the switching unit illustrated in FIG. 12.

FIG. 13 is a diagram showing an example of a detailed configuration of the multiplexers 12-0 to 12-m included in the switching unit 120A-2 illustrated in FIG. 12.

Each of the multiplexers 12-0 to 12-m includes transistors TR individually connected to the touch sensors TS, first terminals of the transistors TR are individually connected to the touch sensors TS, and second terminals of the transistors TR are connected to an output terminal. Gate terminals of the transistors TR receive the address signals A0 to An. Herein, the address signals A0 to An are column selection signals.

Specifically, first terminals of the transistors TR included in the multiplexer 12-0 are individually connected to the n+1 touch sensors TS provided in the first row R0 of the touch panel 110A. That is, in the multiplexer 12-0, the first terminal of the transistor TR having received the address signal A0 through the gate terminal thereof is connected to the touch sensor TS provided in a first column C0 of the first row R0 (R0×C0) of the touch panel 110A, and the second terminal thereof is connected to the output terminal B0 of the multiplexer 12-0. In the multiplexer 12-0, the first terminal of the transistor TR having received the address signal A1 through the gate terminal thereof is connected to the touch sensor TS provided in a second column C1 of the first row R0 (R0×C1) of the touch panel 110A, and the second terminal thereof is connected to the output terminal B0 of the multiplexer 12-0. In this manner, in the multiplexer 12-0, the first terminal of the transistor TR having received the address signal An through the gate terminal thereof is connected to the touch sensor TS provided in an (n+1)-th column Cn of the first row R0 (R0×Cn) of the touch panel 110A, and the second terminal thereof is connected to the output terminal B0 of the multiplexer 12-0.

Furthermore, first terminals of the transistors TR included in the multiplexer 12-1 are individually connected to the n+1 touch sensors TS provided in the second row R1 of the touch panel 110A. That is, in the multiplexer 12-1, the first terminal of the transistor TR having received the address signal A0 through the gate terminal thereof is connected to the touch sensor TS provided in the first column C0 of the second row R1 (R1×C0) of the touch panel 110A, and the second terminal thereof is connected to the output terminal B1 of the multiplexer 12-1. In the multiplexer 12-1, the first terminal of the transistor TR having received the address signal A1 through the gate terminal thereof is connected to the touch sensor TS provided in the second column C1 of the second row R1 (R1×C1) of the touch panel 110A, and the second terminal thereof is connected to the output terminal B1 of the multiplexer 12-1. In this manner, in the multiplexer 12-1, the first terminal of the transistor TR having received the address signal An through the gate terminal thereof is connected to the touch sensor TS provided in the (n+1)-th column Cn of the second row R1 (R1×Cn) of the touch panel 110A, and the second terminal thereof is connected to the output terminal B1 of the multiplexer 12-1.

In this manner, first terminals of the transistors TR included in the multiplexer 12-m are individually connected to the n+1 touch sensors TS provided in the (m+1)-th row Rm of the touch panel 110A. That is, in the multiplexer 12-m, the first terminal of the transistor TR having received the address signal A0 through the gate terminal thereof is connected to the touch sensor TS provided in the first column C0 of the (m+1)-th row Rm (Rm×C0) of the touch panel 110A, and the second terminal thereof is connected to the output terminal Bm of the multiplexer 12-m. In the multiplexer 12-m, the first terminal of the transistor TR having received the address signal A1 through the gate terminal thereof is connected to the touch sensor TS provided in the second column C1 of the (m+1)-th row Rm (Rm×C1) of the touch panel 110A, and the second terminal thereof is connected to the output terminal Bm of the multiplexer 12-m. In this manner, in the multiplexer 12-m, the first terminal of the transistor TR having received the address signal An through the gate terminal thereof is connected to the touch sensor TS provided in the (n+1)-th column Cn of the (m+1)-th row Rm (Rm×Cn) of the touch panel 110A, and the second terminal thereof is connected to the output terminal Bm of the multiplexer 12-m.

For example, the transistors TR included in the multiplexers 12-0 to 12-m may be implemented as thin film transistors.

Referring to FIGS. 1 and 13, m+1 lines are required between the switching unit 120A-2 and the touch controller 200A to transmit sensing signals of m×n touch sensors TS of the touch panel 110A to the touch controller 200A. As such, the number of lines between the switching unit 120A-2 and the touch controller 200A may be reduced.

Figure 14:
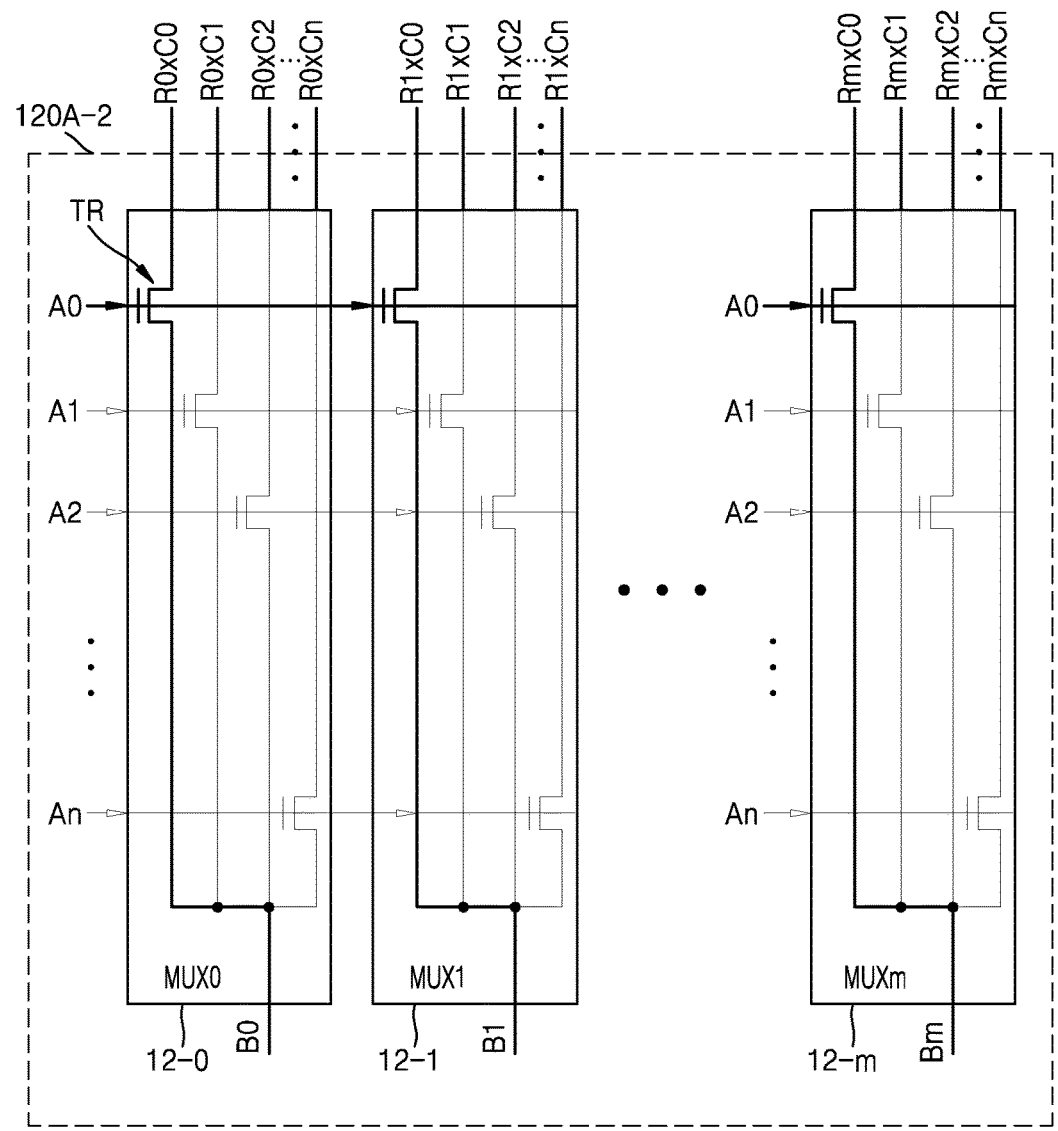
FIG. 14 is a diagram for describing operations of the multiplexers illustrated in FIG. 13.

FIG. 14 is a diagram for describing operations of the multiplexers 12-0 to 12-m illustrated in FIG. 13.

FIG. 14 shows operations of the multiplexers 12-0 to 12-m in a case when the address signal A0 among the address signals A0 to An is in a selection logic state and the other address signals A1 to An are in a non-selection logic state.

Since the address signal A0 is in a selection logic state, only the transistors TR having received the address signal A0 through the gate terminals thereof are turned on and the other transistors TR are turned off.

As such, the multiplexer 12-0 selects a sensing signal of the touch sensor TS provided in the first column C0 of the first row R0 (R0×C0) among the n+1 touch sensors TS provided in the first row R0 of the touch panel 110A, and transmits the selected sensing signal of the touch sensor TS of R0×C0 through the output terminal B0 to the touch controller 200A.

The multiplexer 12-1 selects a sensing signal of the touch sensor TS provided in the first column C0 of the second row R1 (R1×C0) among the n+1 touch sensors TS provided in the second row R1 of the touch panel 110A, and transmits the selected sensing signal of the touch sensor TS of R1×C0 through the output terminal B1 to the touch controller 200A.

In this manner, the multiplexer 12-m selects a sensing signal of the touch sensor TS provided in the first column C0 of the (m+1)-th row Rm (Rm×C0) among the n+1 touch sensors TS provided in the (m+1)-th row Rm of the touch panel 110A, and transmits the selected sensing signal of the touch sensor TS of Rm×C0 through the output terminal Bm to the touch controller 200A.

As such, when the address signal A0 among the address signals A0 to An applied to the switching unit 120A-2 is in a selection logic state and the other address signals A1 to An are in a non-selection logic state, the sensing signals of the touch sensors TS provided in the first column C0 of the touch panel 110A are individually transmitted through the output terminals B0 to Bm to the touch controller 200A.

In this manner, when the address signal Aj among the address signals A0 to An applied to the switching unit 120A-2 is in a selection logic state and the other address signals are in a non-selection logic state, the sensing signals of the touch sensors TS provided in the (j+1)-th column Cj of the touch panel 110A may be individually transmitted through the output terminals B0 to Bm to the touch controller 200A.

Figure 15:
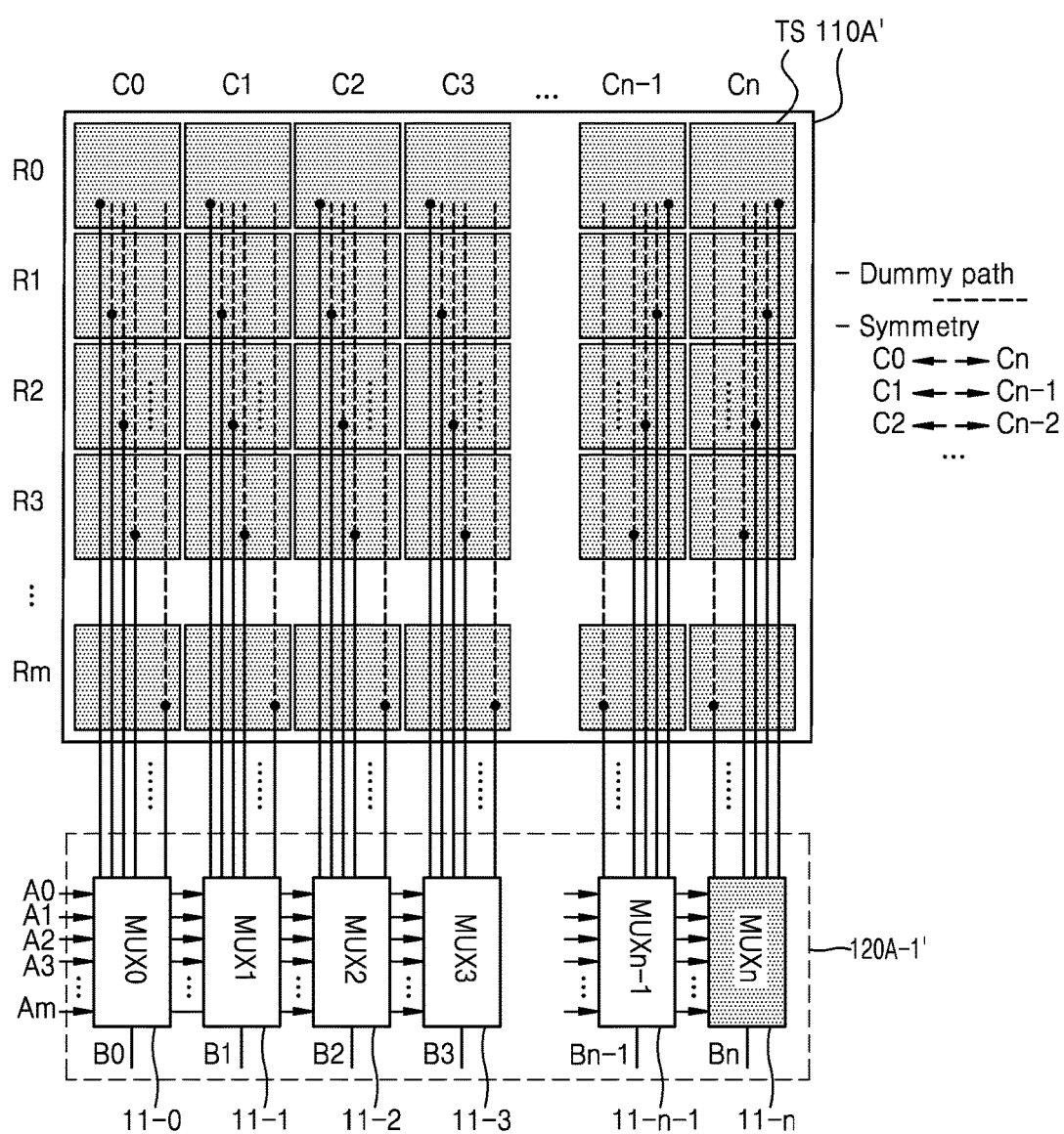
FIG. 15 is a diagram for describing a design scheme for compensating for sensing load differences among touch sensors by using dummy path patterns in FIG. 9.

FIG. 15 is a diagram for describing a design scheme for compensating sensing load differences among touch sensors TS by using dummy path patterns in FIG. 9.

A touch panel 110A' may include a plurality of touch sensors TS arranged in m+1 rows (m is an integer equal to or greater than 1) and n+1 columns (n is an integer equal to or greater than 1).

The difference in length of path patterns for connecting the touch sensors TS of the touch panel 110A' to multiplexers 11-0 to 11-n of a switching unit 120A-1' leads to the difference in capacitance value of paths from output terminals B0 to Bn of the multiplexers 11-0 to 11-n to the touch sensors TS. The difference in capacitance value may lead to the difference in sensing sensitivity of the touch sensors TS.

According to an embodiment of the disclosure, dummy patterns are added to achieve equal lengths of the path patterns for connecting the touch sensors TS to the multiplexers 11-0 to 11-n. Referring to FIG. 15, if the dummy patterns are added as indicated by dashed lines, the path patterns for connecting the touch sensors TS to the switching unit 120A-1' have equal lengths.

In addition, according to an embodiment of the disclosure, the path patterns for columns are designed to be symmetrical to each other at two opposite sides with respect to a central multiplexer of the switching unit 120A-1' such that the touch sensors TS provided in edge regions of the touch panel 110A' have similar touch characteristics. For example, as illustrated in FIG. 15, the path patterns of the touch sensors TS provided in a first column C0 and a last column Cn of the touch panel 110A' are designed to be symmetrical to each other. In this manner, the path patterns of the touch sensors TS provided in a second column C1 and an n-th column Cn−1 of the touch panel 110A' are designed to be symmetrical to each other.

By designing the path patterns as described above, the touch sensors TS provided in edge regions of the touch panel 110A' may have equal sensing sensitivities.

Figure 16:
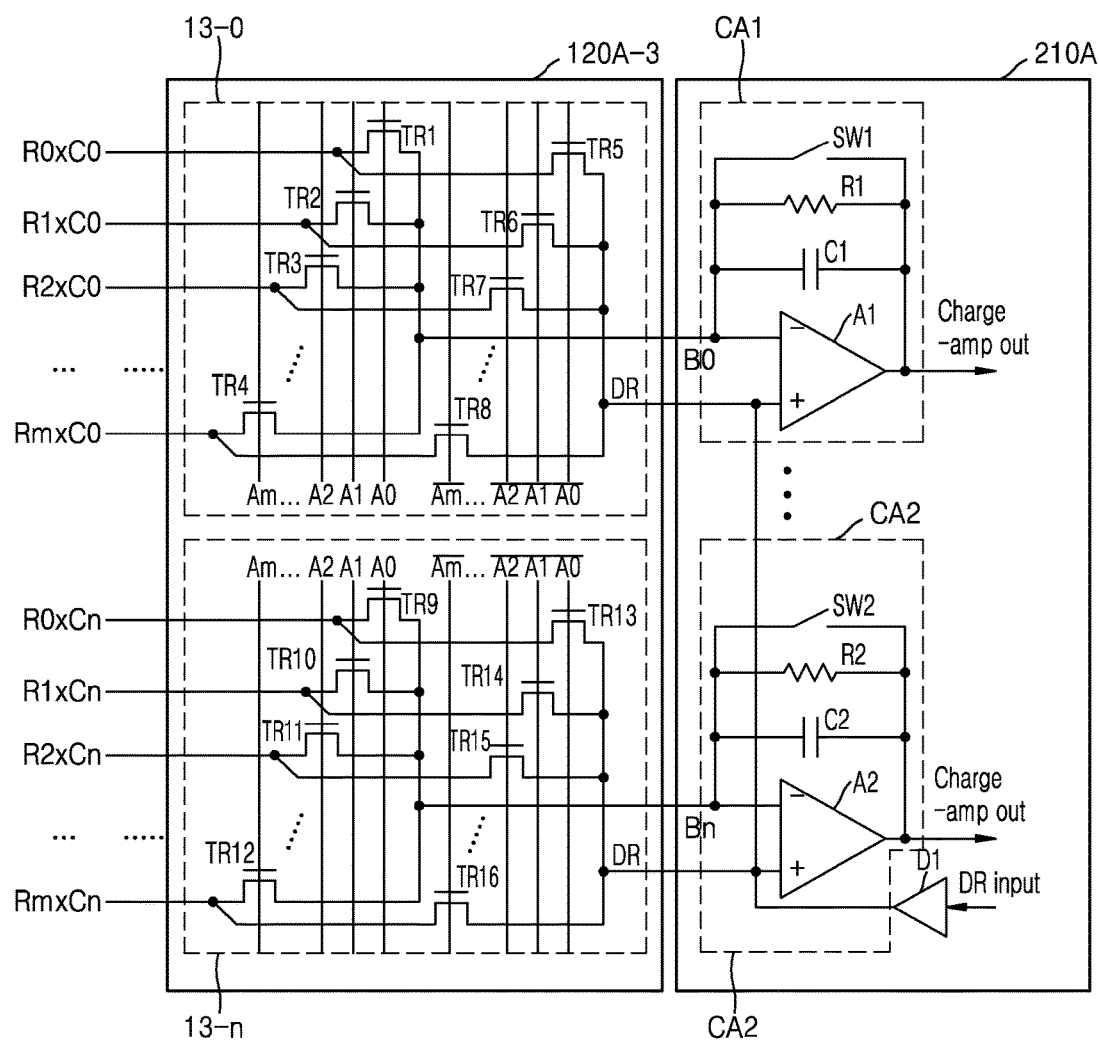
FIG. 16 is a diagram for describing an example of a connection structure of a switching unit and a touch controller in FIG. 1.

FIG. 16 is a diagram for describing an example of a connection structure of a switching unit 120A-3 and a touch controller 210A in FIG. 1. Specifically, FIG. 16 shows an example of a connection structure of the switching unit 120A-3 and the touch controller 210A in the touch sensing system 1000A using a self-capacitance sensing scheme.

The switching unit 120A-3 includes a plurality of multiplexers 13-0 to 13-n. The touch controller 210A includes a plurality of charge amplification units CA1 to CA2 and a driver circuit D1. For example, the number of the multiplexers 13-0 to 13-n and the number of the charge amplification units CA1 to CA2 may be equal to the number of columns of the touch sensors TS provided in the touch panel 110A.

A driving signal output from the driver circuit D1 is used for active shielding to reduce parasitic capacitance generated in the structure of the touch panel 110A illustrated in FIG. 9 or 12.

The multiplexer 13-0 includes a plurality of transistors TR1 to TR8. First terminals of the transistors TR1 to TR4 are individually connected to the touch sensors TS of R0×C0, R1×C0, R2×C0, . . . , and Rm×C0, and second terminals thereof are connected to an output terminal B0 of the multiplexer 13-0. Gate terminals of the transistors TR1 to TR4 receive address signals A0, A1, A2, . . . , and Am. First terminals of the transistors TR5 to TR8 are connected to a driving terminal DR, and second terminals thereof are individually connected to the touch sensors TS of R0×C0, R1×C0, R2×C0, . . . , and Rm×C0. Gate terminals of the transistors TR5 to TR8 receive inverted address signals /A0, /A1, /A2, . . . , and /Am.

The multiplexer 13-n includes a plurality of transistors TR9 to TR16. First terminals of the transistors TR9 to TR12 are individually connected to the touch sensors TS of R0×Cn, R1×Cn, R2×Cn, . . . , and Rm×Cn, and second terminals thereof are connected to an output terminal Bn of the multiplexer 13-n. Gate terminals of the transistors TR9 to TR16 receive the address signals A0, A1, A2, . . . , and Am. First terminals of the transistors TR13 to TR16 are connected to a driving terminal DR, and second terminals thereof are individually connected to the touch sensors TS of R0×Cn, R1×Cn, R2×Cn, . . . , and Rm×Cn. Gate terminals of the transistors TR13 to TR16 receive the inverted address signals /A0, /A1, /A2, . . . , and /Am.

For example, when the address signal A0 among the address signals A0 to Am is in a selection logic state and the other address signals A1 to Am are in a non-selection logic state, the multiplexer 13-0 and the multiplexer 13-n operate as described below.

In the multiplexer 13-0, the transistors TR1, and TR6 to TR8 are turned on and the transistors TR2 to TR5 are turned off. As such, a driving signal of the driving terminal DR is applied to the touch sensors TS of R1×C0, R2×C0, . . . , and Rm×C0, and a sensing signal of the touch sensor TS of R0×C0 is transmitted through the output terminal B0 to the touch controller 210A.

In the multiplexer 13-n, the transistors TR9, and TR14 to TR16 are turned on and the transistors TR10 to TR13 are turned off. As such, a driving signal of the driving terminal DR is applied to the touch sensors TS of R1×Cn, R2×Cn, . . . , and Rm×Cn, and a sensing signal of the touch sensor TS of R0×Cn is transmitted through the output terminal Bn to the touch controller 210A.

According to the above operation, a driving signal is supplied to the touch sensors TS other than one row of the touch sensors TS, sensing signals of which are transmitted to the touch controller 210A. For example, the driving signal may be a DC voltage for shielding.

Due to active shielding using the driving signal, parasitic capacitance generated by the touch sensors TS other than the touch sensors TS which sense touch may be reduced.

The charge amplification unit CA1 includes an operational amplifier (OP amp) A1, a switch SW1, a resistor R1, and a capacitor C1. A first input terminal − of the OP amp A1 is connected to the output terminal B0 of the multiplexer 13-0, and a second input terminal + thereof is connected to the driving terminal DR. The switch SW1, the resistor R1, and the capacitor C1 are connected in parallel to each other between the first input terminal − and an output terminal of the OP amp A1.

The charge amplification unit CA2 includes an OP amp A2, a switch SW2, a resistor R2, and a capacitor C2. A first input terminal − of the OP amp A2 is connected to the output terminal Bn of the multiplexer 13-n, and a second input terminal + thereof is connected to the driving terminal DR. The switch SW2, the resistor R2, and the capacitor C2 are connected in parallel to each other between the first input terminal − and an output terminal of the OP amp A2.

Due to the above-described circuit configuration, the charge amplification unit CA1 and the charge amplification unit CA2 perform signal processing to amplify the sensing signal output from the output terminal B0 of the multiplexer 13-0 and the sensing signal output from the output terminal Bn of the multiplexer 13-n, respectively.

For example, the switch SW1 and the switch SW2 may be turned on before a touch sensing operation to reset the charge amplification unit CA1 and the charge amplification unit CA2, respectively.

The driver circuit D1 generates a driving signal for active shielding and outputs the same to the driving terminals DR. For example, the driving signal may be a DC voltage.

Figure 17:
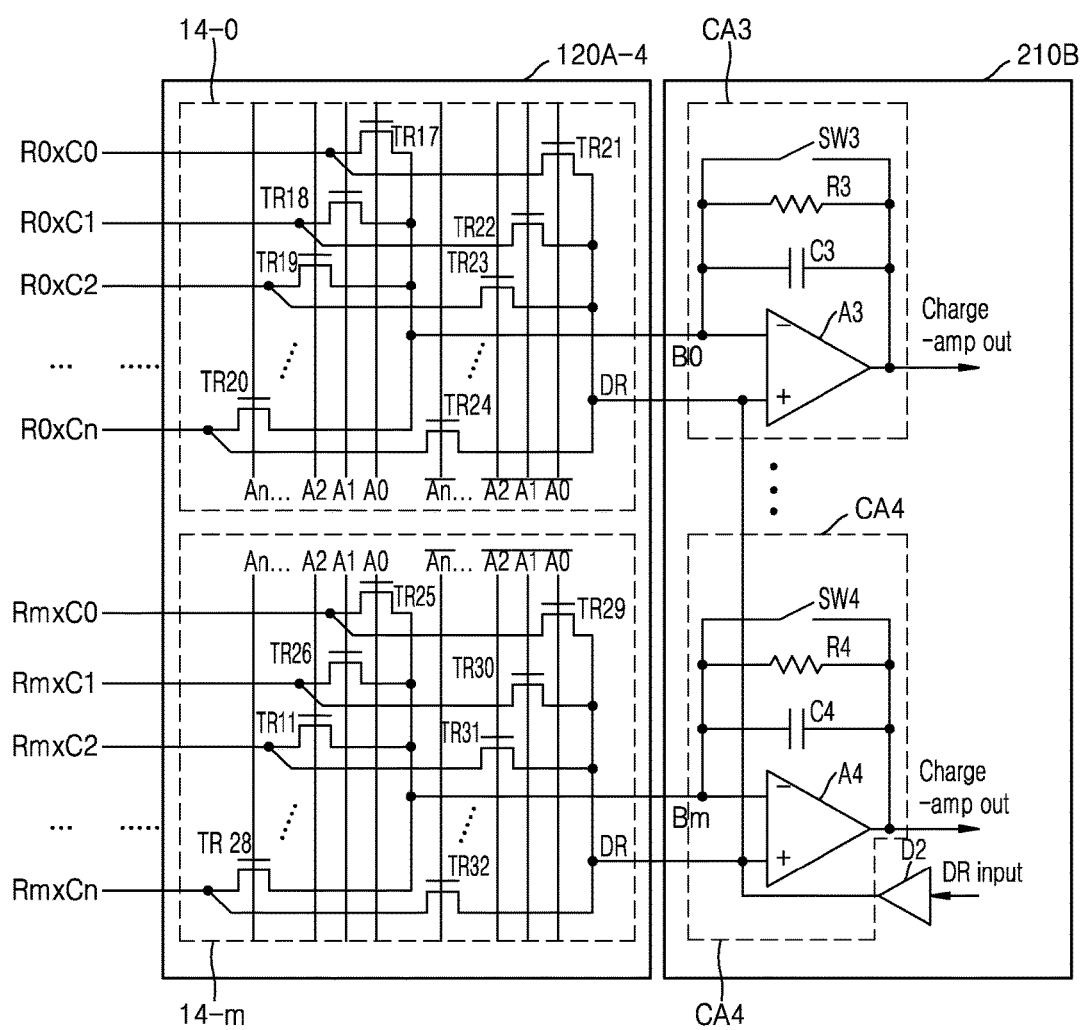
FIG. 17 is a diagram for describing another example of a connection structure of a switching unit and a touch controller in FIG. 1.

FIG. 17 is a diagram for describing another example of a connection structure of a switching unit 120A-4 and a touch controller 210B in FIG. 1. Specifically, FIG. 17 shows another example of a connection structure of the switching unit 120A-4 and the touch controller 210B in the touch sensing system 1000A using a self-capacitance sensing scheme.

The switching unit 120A-4 includes a plurality of multiplexers 14-0 to 14-m. The touch controller 210B includes a plurality of charge amplification units CA3 to CA4 and a driver circuit D2. For example, the number of the multiplexers 14-0 to 14-m and the number of the charge amplification units CA3 to CA4 may be equal to the number of rows of the touch sensors TS provided in the touch panel 110A.

A driving signal output from the driver circuit D2 is used for active shielding to reduce parasitic capacitance generated in the structure of the touch panel 110A illustrated in FIG. 9 or 12.

The multiplexer 14-0 includes a plurality of transistors TR17 to TR24. First terminals of the transistors TR17 to TR20 are individually connected to the touch sensors TS of R0×C0, R0×C1, R0×C2, . . . , and R0×Cn, and second terminals thereof are connected to an output terminal B0 of the multiplexer 14-0. Gate terminals of the transistors TR17 to TR20 receive address signals A0, A1, A2, . . . , and An. First terminals of the transistors TR21 to TR24 are connected to a driving terminal DR, and second terminals thereof are individually connected to the touch sensors TS of R0×C0, R0×C1, R0×C2, . . . , and R0×Cn. Gate terminals of the transistors TR21 to TR24 receive inverted address signals /A0, /A1, /A2, . . . , and /An.

The multiplexer 14-m includes a plurality of transistors TR25 to TR32. First terminals of the transistors TR25 to TR28 are individually connected to the touch sensors TS of Rm×C0, Rm×C1, Rm×C2, . . . , and Rm×Cn, and second terminals thereof are connected to an output terminal Bm of the multiplexer 14-m. Gate terminals of the transistors TR25 to TR28 receive the address signals A0, A1, A2, . . . , and An. First terminals of the transistors TR29 to TR32 are connected to a driving terminal DR, and second terminals thereof are individually connected to the touch sensors TS of Rm×C0, Rm×C1, Rm×C2, . . . , and Rm×Cn. Gate terminals of the transistors TR29 to TR32 receive the inverted address signals /A0, /A1, /A2, . . . , and /An.

For example, when the address signal A0 among the address signals A0 to An is in a selection logic state and the other address signals A1 to An are in a non-selection logic state, the multiplexer 14-0 and the multiplexer 14-m operate as described below.

In the multiplexer 14-0, the transistors TR17, and TR22 to TR24 are turned on and the transistors TR18 to TR21 are turned off. As such, a driving signal of the driving terminal DR is applied to the touch sensors TS of R0×C1, R0×C2, . . . , and R0×Cn, and a sensing signal of the touch sensor TS of R0×C0 is transmitted through the output terminal B0 to the touch controller 210B.

In the multiplexer 14-m, the transistors TR25, and TR30 to TR32 are turned on and the transistors TR26 to TR29 are turned off. As such, a driving signal of the driving terminal DR are applied to the touch sensors TS of Rm×C1, Rm×C2, . . . , and Rm×Cn, and a sensing signal of the touch sensor TS of Rm×C0 is transmitted through the output terminal Bm to the touch controller 210B.

According to the above operation, a driving signal is supplied to the touch sensors TS other than the touch sensors TS, sensing signals of which are transmitted to the touch controller 210B. For example, the driving signal may be a DC voltage for shielding.

Due to active shielding using the driving signal, parasitic capacitance generated by the touch sensors TS other than one column of the touch sensors TS which sense touch may be reduced.

The charge amplification unit CA3 includes an OP amp A3, a switch SW3, a resistor R3, and a capacitor C3. A first input terminal − of the OP amp A3 is connected to the output terminal B0 of the multiplexer 14-0, and a second input terminal + thereof is connected to the driving terminal DR. The switch SW3, the resistor R3, and the capacitor C3 are connected in parallel to each other between the first input terminal − and an output terminal of the OP amp A3.

The charge amplification unit CA4 includes an OP amp A4, a switch SW4, a resistor R4, and a capacitor C4. A first input terminal − of the OP amp A4 is connected to the output terminal Bm of the multiplexer 14-*m*, and a second input terminal + thereof is connected to the driving terminal DR. The switch SW4, the resistor R4, and the capacitor C4 are connected in parallel to each other between the first input terminal − and an output terminal of the OP amp A4.

Due to the above-described circuit configuration, the charge amplification unit CA3 and the charge amplification unit CA4 perform signal processing to amplify the sensing signal output from the output terminal B0 of the multiplexer 14-0 and the sensing signal output from the output terminal Bm of the multiplexer 14-*m*, respectively.

For example, the switch SW3 and the switch SW4 may be turned on before a touch sensing operation to reset the charge amplification unit CA3 and the charge amplification unit CA4, respectively.

The driver circuit D2 generates a driving signal for active shielding and outputs the same to the driving terminals DR. For example, the driving signal may be a DC voltage.

Figure 18:
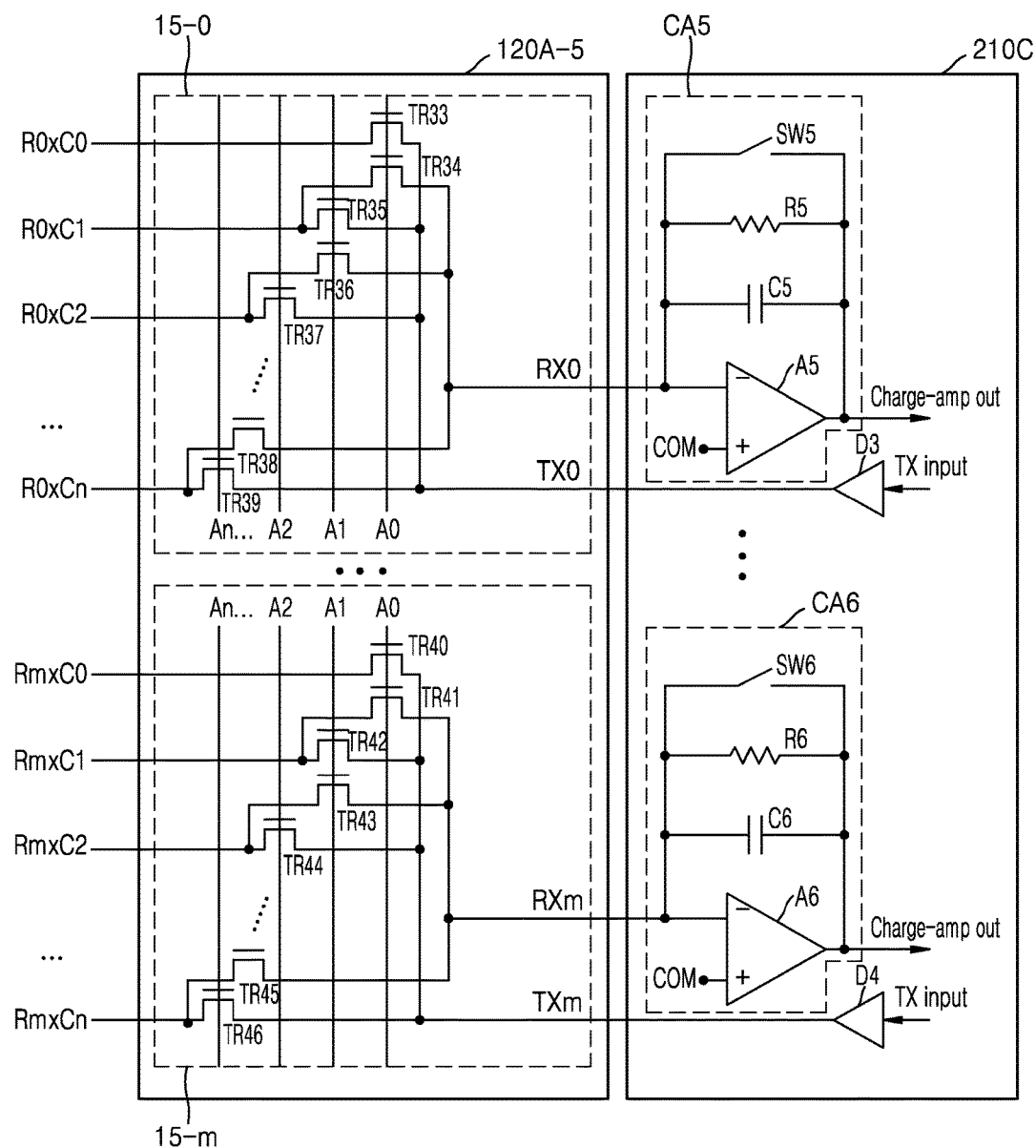
FIG. 18 is a diagram for describing another example of a connection structure of a switching unit and a touch controller in FIG. 1.

FIG. 18 is a diagram for describing another example of a connection structure of a switching unit 120A-5 and a touch controller 210C in FIG. 1. Specifically, FIG. 18 shows an example of a connection structure of the switching unit 120A-5 and the touch controller 210C in the touch sensing system 1000A using a mutual-capacitance sensing scheme.

The switching unit 120A-5 includes a plurality of multiplexers 15-0 to 15-*m*. The touch controller 210C includes a plurality of charge amplification units CA5 to CA6 and a plurality of driver circuits D3 to D4. For example, the number of the multiplexers 15-0 to 15-*m* and the number of the charge amplification units CA5 to CA6 may be equal to the number of rows of the touch sensors TS provided in the touch panel 110A.

The multiplexer 15-0 includes a plurality of transistors TR33 to TR39. First terminals of the transistors TR34, TR36, . . . , and TR38 are individually connected to the touch sensors TS of R0×C1, R0×C2, . . . , and R0×Cn, and second terminals thereof are connected to an output terminal RX0 of the multiplexer 15-0. Gate terminals of the transistors TR34, TR36, . . . , and TR38 receive address signals A0, A1, . . . , and An−1. First terminals of the transistors TR33, TR35, TR37, . . . , and TR39 are connected to a driving terminal TX0, and second terminals thereof are individually connected to the touch sensors TS of R0×C0, R0×C1, R0×C2, . . . , and R0×Cn. Gate terminals of the transistors TR33, TR35, TR37, and TR39 receive address signals A0, A1, A2, . . . , and An.

The multiplexer 15-*m* includes a plurality of transistors TR40 to TR46. First terminals of the transistors TR41, TR43, . . . , and TR45 are individually connected to the touch sensors TS of Rm×C1, Rm×C2, . . . , and Rm×Cn, and second terminals thereof are connected to an output terminal RXm of the multiplexer 15-*m*. Gate terminals of the transistors TR41, TR43, . . . , and TR45 receive the address signals A0, A1, . . . , and An−1. First terminals of the transistors TR40, TR42, TR44, . . . , and TR46 are connected to a driving terminal TXm, and second terminals thereof are individually connected to the touch sensors TS of Rm×C0, Rm×C1, Rm×C2, . . . , and Rm×Cn. Gate terminals of the transistors TR40, TR42, TR44, . . . , and TR46 receive the address signals A0, A1, A2, . . . , and An.

For example, when the address signal A0 among the address signals A0 to An is in a selection logic state and the other address signals A1 to An are in a non-selection logic state, the multiplexer 15-0 and the multiplexer 15-*m* operate as described below.

In the multiplexer 15-0, the transistors TR33 and TR34 are turned on and the other transistors TR35 to TR39 are turned off. As such, a driving signal of the driving terminal TX0 is applied through the transistor TR33 to the touch sensor TS of R0×C0, and a sensing signal of the touch sensor TS of R0×C1 is transmitted through the output terminal RX0 to the touch controller 210C.

In the multiplexer 15-*m*, the transistors TR40 and TR41 are turned on and the other transistors TR42 to TR46 are turned off. As such, a driving signal of the driving terminal TXm is applied through the transistor TR40 to the touch sensors TS of Rm×C0, and a sensing signal of the touch sensor TS of Rm×C1 is transmitted through the output terminal RXm to the touch controller 210C.

According to the above-described operation, a driving signal is supplied to the touch sensors TS provided in the column C0, and sensing signals of the touch sensors TS provided in the column C1 are transmitted to the touch controller 210C.

The charge amplification unit CA5 includes an OP amp A5, a switch SW5, a resistor R5, and a capacitor C5. A first input terminal − of the OP amp A5 is connected to the output terminal RX0 of the multiplexer 15-0, and a second input terminal + thereof receives a common voltage COM. The switch SW5, the resistor R5, and the capacitor C5 are connected in parallel to each other between the first input terminal − and an output terminal of the OP amp A5.

The charge amplification unit CA6 includes an OP amp A6, a switch SW6, a resistor R6, and a capacitor C6. A first input terminal − of the OP amp A6 is connected to the output terminal RXm of the multiplexer 15-*m*, and a second input terminal + thereof receives a common voltage COM. The switch SW6, the resistor R6, and the capacitor C6 are connected in parallel to each other between the first input terminal − and an output terminal of the OP amp A6.

Due to the above-described circuit configuration, the charge amplification unit CA5 and the charge amplification unit CA6 perform signal processing to amplify the sensing signal output from the output terminal RX0 of the multiplexer 15-0 and the sensing signal output from the output terminal RXm of the multiplexer 15-*m*, respectively.

For example, the switch SW5 and the switch SW6 may be turned on before a touch sensing operation to reset the charge amplification unit CA5 and the charge amplification unit CA6, respectively.

The driver circuits D3 to D4 generate driving signals to be supplied to the touch sensors TS provided in the rows R0 to Rm and output the same to the driving terminals TX0 to TXm, respectively. For example, the driving signal may be configured as a square wave signal having an initially set frequency.

Figure 19:
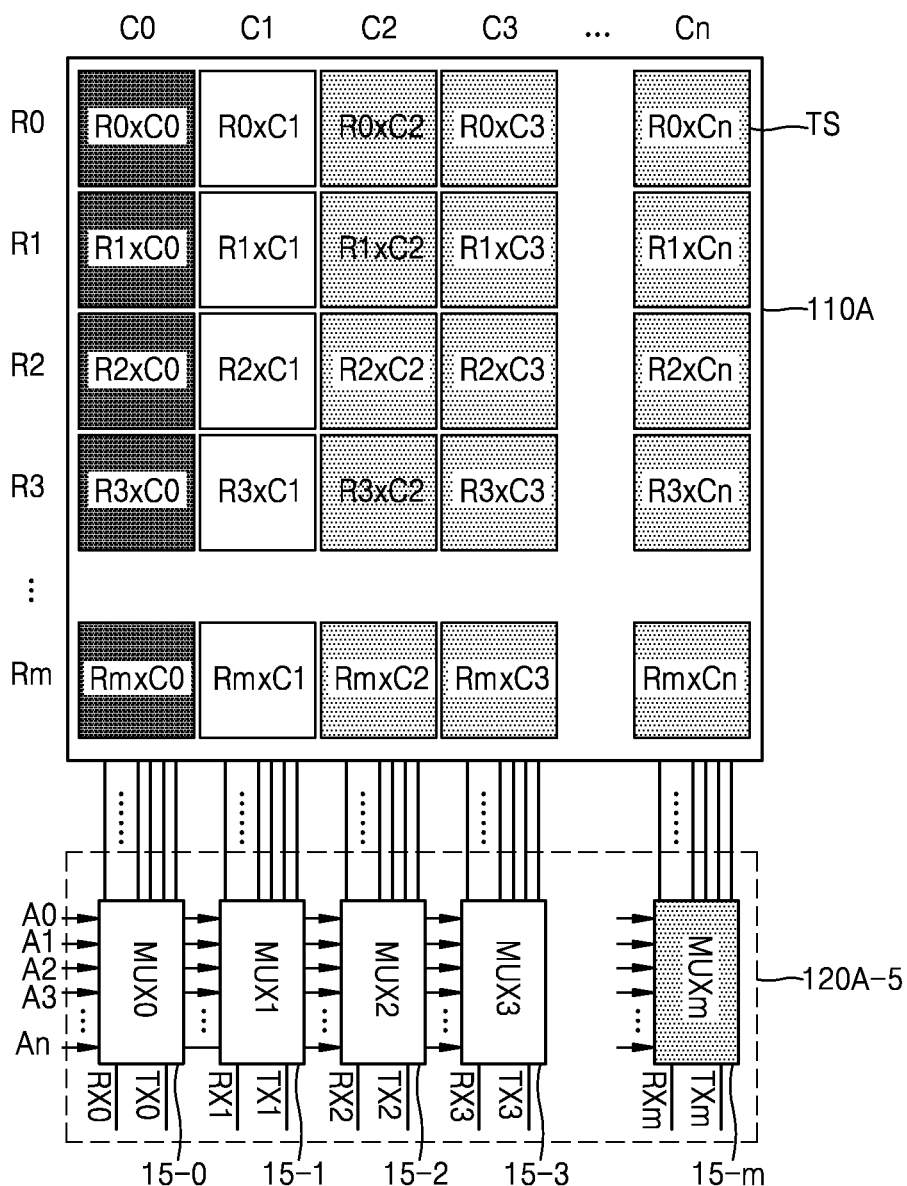
FIG. 19 is a diagram for describing a touch sensing operation in FIG. 18.

FIG. 19 is a diagram for describing a touch sensing operation in FIG. 18.

For example, when the address signal A0 among the address signals A0 to An is in a selection logic state and the other address signals A1 to An are in a non-selection logic state, the switching unit 120A-5 applies a driving signal to the touch sensors TS provided in the column C0. Sensing signals of the touch sensors TS provided in the column C1 are transmitted through the switching unit 120A-5 to the controller 210C. In this case, the touch sensors TS provided in the column C0 operate as driving electrodes, and the touch sensors TS provided in the column C1 operate as sensing electrodes.

As another example, when the address signal A1 among the address signals A0 to An is in a selection logic state and the other address signals A0, and A2 to An are in a non-selection logic state, the switching unit 120A-5 applies a driving signal to the touch sensors TS provided in the column C1. Sensing signals of the touch sensors TS provided in the column C2 are transmitted through the switching unit 120A-5 to the controller 210C. In this case, the touch sensors TS provided in the column C1 operate as driving electrodes, and the touch sensors TS provided in the column C2 operate as sensing electrodes.

Figure 20:
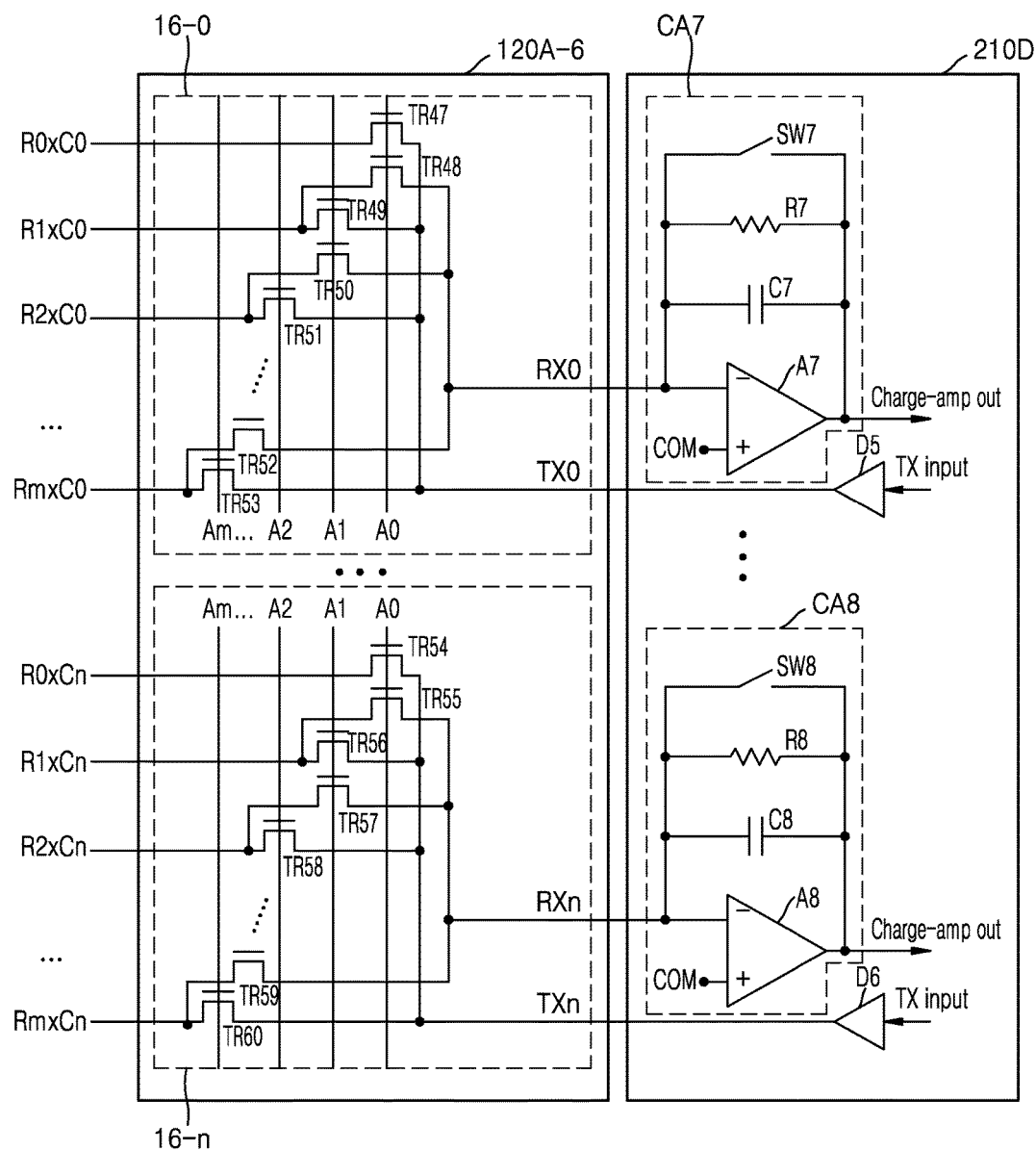
FIG. 20 is a diagram for describing another example of a connection structure of a switching unit and a touch controller in FIG. 1.

FIG. 20 is a diagram for describing another example of a connection structure of a switching unit 120A-6 and a touch controller 210D in FIG. 1. Specifically, FIG. 20 shows an example of a connection structure of the switching unit 120A-6 and the touch controller 210D in the touch sensing system 1000A using a mutual-capacitance sensing scheme.

The switching unit 120A-6 includes a plurality of multiplexers 16-0 to 16-n. The touch controller 210D includes a plurality of charge amplification units CA7 to CA8 and a plurality of driver circuits D5 to D6. For example, the number of the multiplexers 16-0 to 16-n and the number of the charge amplification units CA7 to CA8 may be equal to the number of columns of the touch sensors TS provided in the touch panel 110A.

The multiplexer 16-0 includes a plurality of transistors TR47 to TR53. First terminals of the transistors TR48, TR50, . . . , and TR52 are individually connected to the touch sensors TS of R1×C0, R2×C0, . . . , and Rm×C0, and second terminals thereof are connected to an output terminal RX0 of the multiplexer 16-0. Gate terminals of the transistors TR48, TR50, . . . , and TR52 receive address signals A0, A1, . . . , and Am−1. First terminals of the transistors TR47, TR49, TR51, . . . , and TR53 are connected to a driving terminal TX0, and second terminals thereof are individually connected to the touch sensors TS of R0×C0, R1×C0, R2×C0, . . . , and Rm×C0. Gate terminals of the transistors TR47, TR49, TR51, and TR53 receive address signals A0, A1, A2, . . . , and Am.

The multiplexer 16-n includes a plurality of transistors TR54 to TR60. First terminals of the transistors TR55, TR57, . . . , and TR59 are individually connected to the touch sensors TS of R1×Cn, R2×Cn, . . . , and Rm×Cn, and second terminals thereof are connected to an output terminal RXn of the multiplexer 16-n. Gate terminals of the transistors TR55, TR57, . . . , and TR59 receive the address signals A0, A1, . . . , and Am−1. First terminals of the transistors TR54, TR56, TR58, . . . , and TR60 are connected to a driving terminal TXn, and second terminals thereof are individually connected to the touch sensors TS of R0×Cn, R1×Cn, R2×Cn, . . . , and Rm×Cn. Gate terminals of the transistors TR54, TR56, TR58, and TR60 receive the address signals A0, A1, A2, . . . , and Am.

For example, when the address signal A0 among the address signals A0 to Am is in a selection logic state and the other address signals A1 to Am are in a non-selection logic state, the multiplexer 16-0 and the multiplexer 16-n operate as described below.

In the multiplexer 16-0, the transistors TR47 and TR48 are turned on and the other transistors TR49 to TR53 are turned off. As such, a driving signal of the driving terminal TX0 is applied through the transistor TR47 to the touch sensor TS of R0×C0, and a sensing signal of the touch sensor TS of R1×C0 is transmitted through the output terminal RX0 to the touch controller 210D.

In the multiplexer 16-n, the transistors TR54 and TR55 are turned on and the other transistors TR56 to TR60 are turned off. As such, a driving signal of the driving terminal TXn is applied through the transistor TR54 to the touch sensors TS of R0×Cn, and a sensing signal of the touch sensor TS of R1×Cn is transmitted through the output terminal RXn to the touch controller 210D.

According to the above-described operation, a driving signal is supplied to the touch sensors TS provided in the row R0, and sensing signals of the touch sensors TS provided in the row R1 are transmitted to the touch controller 210D.

The charge amplification unit CA7 includes an OP amp A7, a switch SW7, a resistor R7, and a capacitor C7. A first input terminal − of the OP amp A7 is connected to the output terminal RX0 of the multiplexer 16-0, and a second input terminal + thereof receives a common voltage COM. The switch SW7, the resistor R7, and the capacitor C7 are connected in parallel to each other between the first input terminal − and an output terminal of the OP amp A7.

The charge amplification unit CA8 includes an OP amp A8, a switch SW8, a resistor R8, and a capacitor C8. A first input terminal − of the OP amp A8 is connected to the output terminal RXn of the multiplexer 16-n, and a second input terminal + thereof receives a common voltage COM. The switch SW8, the resistor R8, and the capacitor C8 are connected in parallel to each other between the first input terminal − and an output terminal of the OP amp A8.

Due to the above-described circuit configuration, the charge amplification unit CA7 and the charge amplification unit CA8 perform signal processing to amplify the sensing signal output from the output terminal RX0 of the multiplexer 16-0 and the sensing signal output from the output terminal RXn of the multiplexer 16-n, respectively.

For example, the switch SW7 and the switch SW8 may be turned on before a touch sensing operation to reset the charge amplification unit CA7 and the charge amplification unit CA8, respectively.

The driver circuits D5 to D6 generate driving signals to be supplied to the touch sensors TS provided in the columns C0 to Cn and output the same to the driving terminals TX0 to TXn, respectively. For example, the driving signal may be configured as a square wave signal having an initially set frequency.

Figure 21:
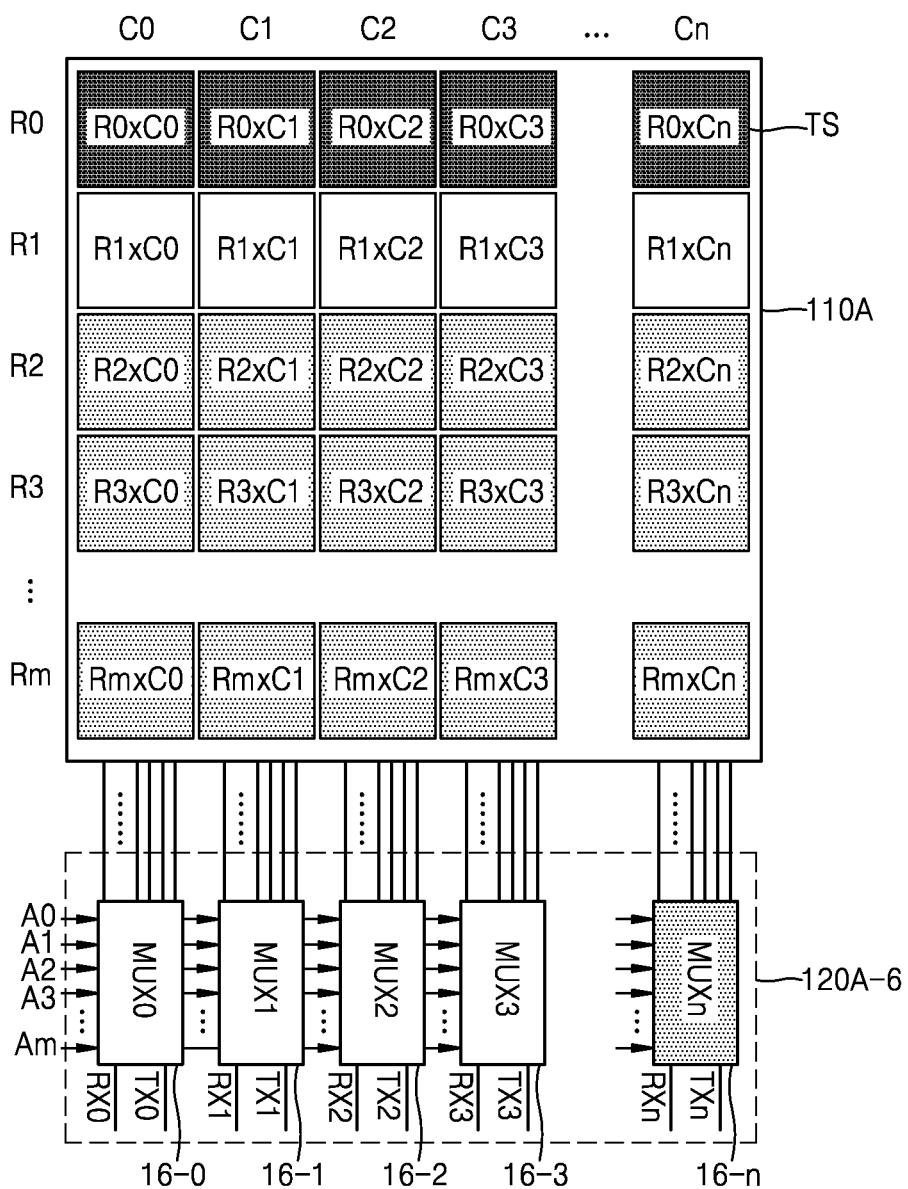
FIG. 21 is a diagram for describing a touch sensing operation in FIG. 20.

FIG. 21 is a diagram for describing a touch sensing operation in FIG. 20.

For example, when the address signal A0 among the address signals A0 to Am is in a selection logic state and the other address signals A1 to Am are in a non-selection logic state, the switching unit 120A-6 applies a driving signal to the touch sensors TS provided in the row R0. Sensing signals of the touch sensors TS provided in the row R1 are transmitted through the switching unit 120A-6 to the controller 210D. In this case, the touch sensors TS provided in the row R0 operate as driving electrodes, and the touch sensors TS provided in the row R1 operate as sensing electrodes.

As another example, when the address signal A1 among the address signals A0 to Am is in a selection logic state and the other address signals A0, and A2 to Am are in a non-selection logic state, the switching unit 120A-6 applies a driving signal to the touch sensors TS provided in the row R1. Sensing signals of the touch sensors TS provided in the row R2 are transmitted through the switching unit 120A-6 to the controller 210D. In this case, the touch sensors TS provided in the row R1 operate as driving electrodes, and the touch sensors TS provided in the row R2 operate as sensing electrodes.

Figure 22:
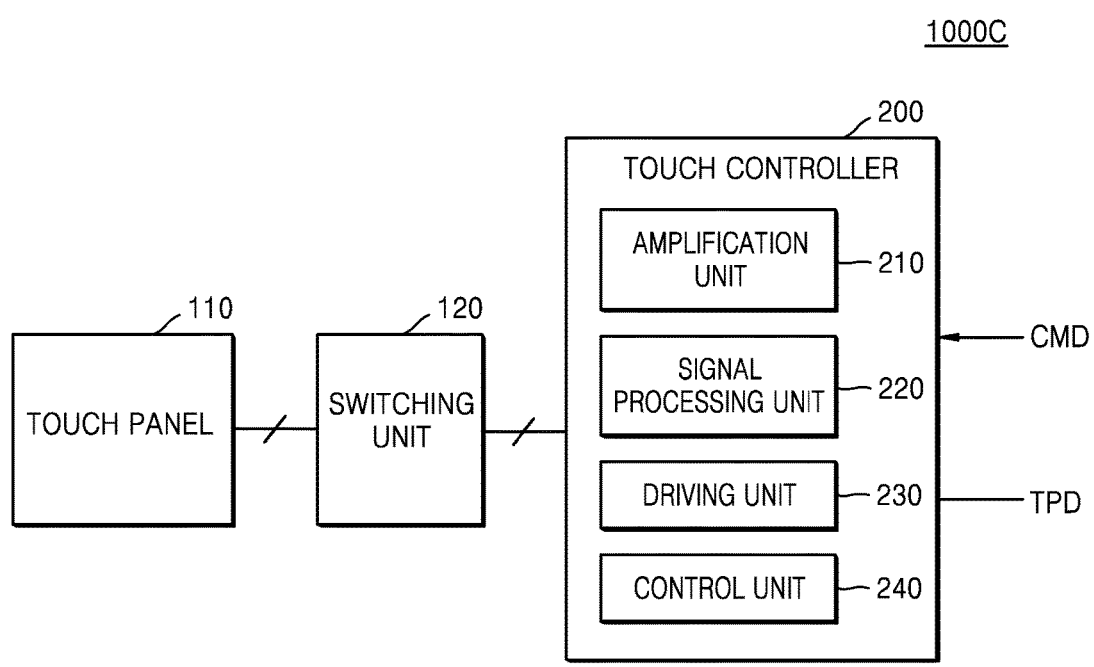
FIG. 22 is a diagram showing a detailed configuration of a touch controller in FIG. 1.

FIG. 22 is a diagram showing a detailed configuration of a touch controller 200 in FIG. 1.

As illustrated in FIG. 22, a touch sensing system 1000C includes a touch panel 110, a switching unit 120, and the touch controller 200.

Detailed descriptions of the touch panel 110 and the switching unit 120 are given above in relation to FIGS. 1 to 21, and thus are omitted herein to avoid redundancy. The following description is focused on the touch controller 200. For example, the switching unit 120 may use at least one of the switching units described above in relation to FIGS. 1 to 21.

Specifically, the touch controller 200 includes an amplification unit 210, a signal processing unit 220, a driving unit 230, and a control unit 240.

The control unit 240 may receive a command CMD from the outside of the touch sensing system 1000C, and may control the elements included in the touch controller 200 according to the received command CMD. For example, the control unit 240 may control the elements of the touch sensing system 1000C based on a self-capacitance sensing scheme or a mutual-capacitance sensing scheme according to the command CMD. For example, the control unit 240 may generate address signals required for switching control of transistors included in the switching unit 120.

The driving unit 230 may generate a driving signal required to sense a variation in capacitance due to touch. For example, when a self-capacitance sensing scheme is used, the driving unit 230 may be implemented as the driver circuit D1 or D2 illustrated in FIG. 16 or 17. As another example, when a mutual-capacitance sensing scheme is used, the driving unit 230 may be implemented as the driver circuits D3 to D4, or D5 to D6 illustrated in FIG. 18 or 20.

The amplification unit 210 may amplify a signal to which the variation in capacitance due to touch is reflected, by amplifying sensing signals of the touch panel 110 which are received through the switching unit 120. For example, the amplification unit 210 may amplify the sensing signals per column or row of the touch sensors TS provided in the touch panel 110A illustrated in FIG. 9 or 12. For example, the amplification unit 210 may be implemented as the charge amplification units illustrated in FIG. 16, 17, 18, or 20.

The signal processing unit 220 may determine the position of a touch input based on the output signal of the amplification unit 210. That is, the signal processing unit 220 may determine the position of an electrode, the capacitance of which varies due to touch, based on the amplified signal received from the amplification unit 210. The signal processing unit 220 may generate touch position data TPD by processing the determined position. The touch position data TPD generated as described above may be output to the outside of the touch sensing system 1000C.

Figure 23:
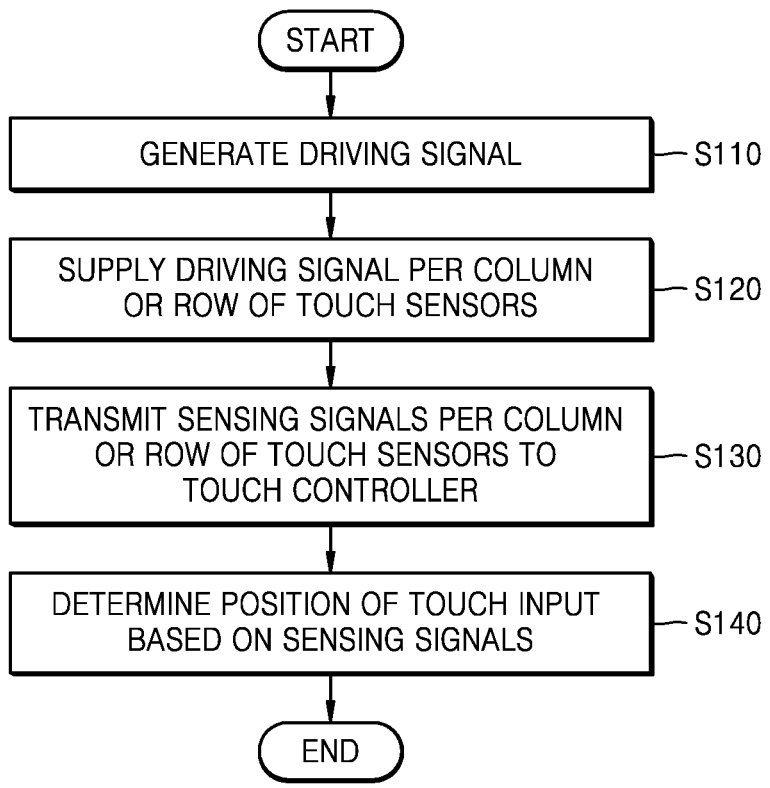
FIG. 23 is a flowchart of a touch sensing method according to an embodiment of the disclosure.

FIG. 23 is a flowchart of a touch sensing method according to an embodiment of the disclosure. For example, the method of FIG. 23 may be performed by the touch sensing system 1000A or 1000B of FIG. 1 or 2.

Initially, the touch controller 200A or 200B generates a driving signal to be supplied to the touch sensors TS provided in the touch panel 110A or 110B (S110). For example, when a self-capacitance sensing scheme is used, the touch controller 200A or 200B may generate a driving signal for active shielding. The driving signal for active shielding may be a signal of a DC voltage to be applied to the touch sensors TS other than one column or row of the touch sensors TS which sense touch. As another example, when a mutual-capacitance sensing scheme is used, the touch controller 200A or 200B may generate a driving signal to be supplied to a column or row of the touch sensors TS adjacent to one column or row of the touch sensors TS which sense touch. The driving signal in this case may be a square wave signal having an initially set frequency.

The switching unit 120A or 120B performs a switching process in such a manner that the driving signal is supplied per column or row of the touch sensors TS (S120). For example, the switching unit 120A or 120B may supply the driving signal per column or row of the touch sensors TS based on address signals received from the touch controller 200A or 200B.

The switching unit 120A or 120B transmits sensing signals per column or row of the touch sensors TS to the touch controller 200A or 200B (S130). For example, the switching unit 120A or 120B may select the touch sensors TS based on the address signals received from the touch controller 200A or 200B, and may transmit sensing signals per column or row of the touch sensors TS through one signal line to the touch controller 200A or 200B.

The touch controller 200A or 200B determines the position of a touch input based on the sensing signals received though the switching unit 120A or 120B (S140).

Figure 24:
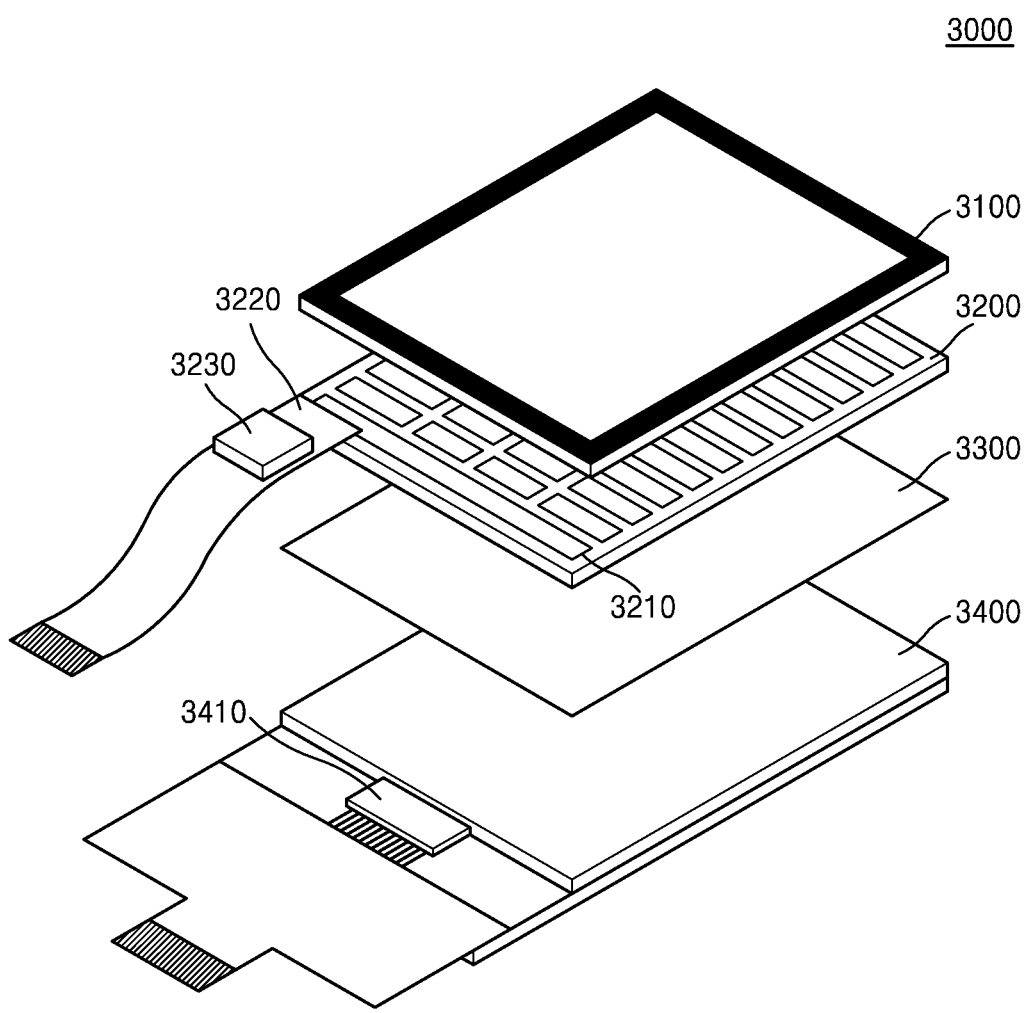
FIG. 24 is a diagram showing an example of the structure of a display apparatus including a touch sensing apparatus according to an embodiment of the disclosure.

FIG. 24 is a diagram showing an example of the structure of a display apparatus 3000 including a touch sensing apparatus 3200 according to an embodiment of the disclosure.

FIG. 24 shows the structure of the display apparatus 3000 in which the touch sensing apparatus 3200 and a display panel 3400 are individually provided. As illustrated in FIG. 24, the display apparatus 3000 may include window glass 3100, the touch sensing apparatus 3200, and the display panel 3400. The display apparatus 3000 may further include a polarizing plate 3300 provided for optical characteristics between the touch sensing apparatus 3200 and the display panel 3400.

The window glass 3100 may be produced using a material such as acryl or tempered glass, and may protect the display apparatus 3000 from being damaged due to external shock or touch of a user. The touch sensing apparatus 3200 may be produced by patterning transparent electrodes, e.g., indium tin oxide (ITO) electrodes, on a transparent substrate. The transparent substrate may be formed of polyethylene terephthalate (PET), polycarbonate (PC), polymethyl methacrylate (PMMA), polyethylene naphthalate (PEN), polyethersulfone (PESU), cyclic olefin copolymer (COC), triacetylcellulose (TAC) film, polyvinyl alcohol (PVA) film, polyimide (PI) film, polystyrene (PS), biaxially oriented polystyrene (BOPS), glass, tempered glass, or the like.

A switching unit 3210 provided in the touch sensing apparatus 3200 may use the switching unit 120A or 120B of FIG. 1 or 2 according to an embodiment of the disclosure.

A touch controller 3230 may be mounted on a flexible printed circuit board (FPCB) 3220 in the form of a chip on board (COB), and may be connected through a plurality of lines to the switching unit 3210 provided in the touch sensing apparatus 3200. The touch controller 3230 may output touch position data TPD to and receive a command signal CMD from the outside of the touch sensing apparatus 3200 through the FPCB 3220. For example, the touch controller 3230 may use the touch controller 200A or 200B of FIG. 1 or 2.

The display panel 3400 may be produced by bonding two sheets of glass, e.g., upper glass and lower glass. For example, the display panel 3400 used for a mobile device may be produced by bonding a display driving circuit 3410 in the form of a chip on glass (COG).

Figure 25:
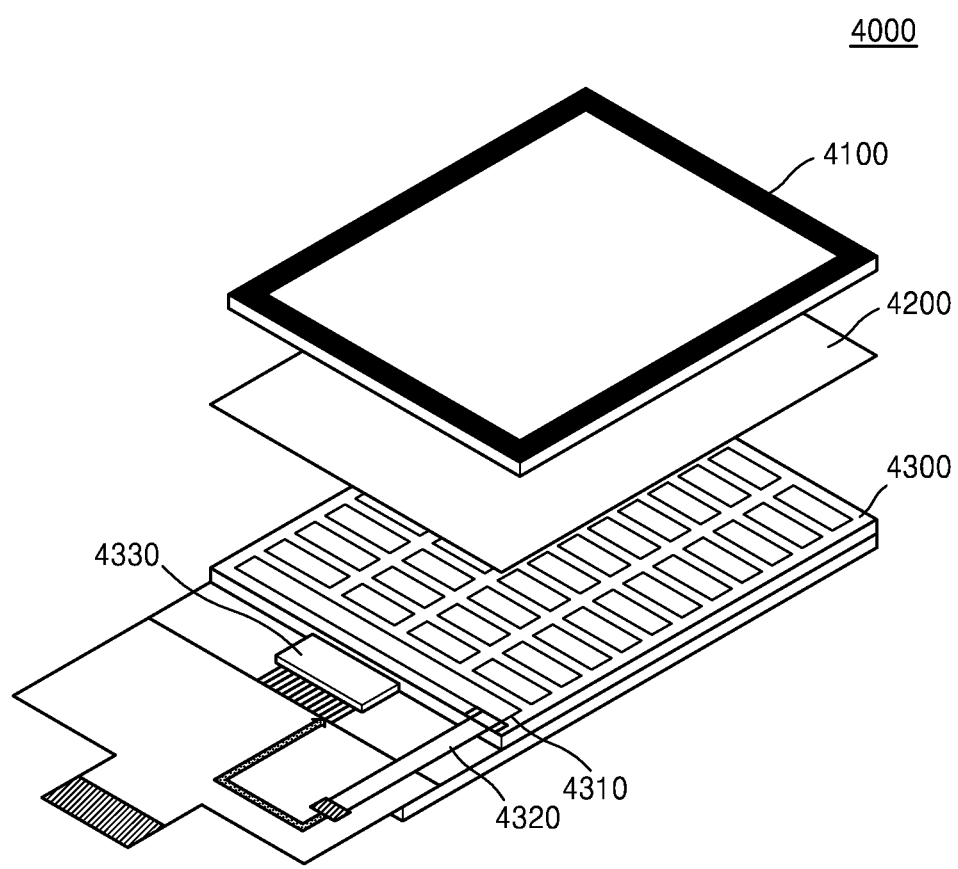
FIG. 25 is a diagram showing another example of the structure of a display apparatus including a touch sensing apparatus according to an embodiment of the disclosure.

FIG. 25 is a diagram showing another example of the structure of a display apparatus 4000 including a touch sensing apparatus according to an embodiment of the disclosure.

FIG. 25 shows the structure of the display apparatus 4000 in which the touch sensing apparatus is integrated with a display panel 4300 according to an embodiment of the disclosure. As illustrated in FIG. 25, the display apparatus 4000 may include window glass 4100, the display panel 4300, and a polarizing plate 4200. Particularly, the touch sensing apparatus according to one of embodiments of the disclosure may be integrated with the display panel 4300 by patterning transparent electrodes on upper glass of the display panel 4300 instead of using an additional glass substrate. In addition, a switching unit 4310 of the touch sensing apparatus may also be integrated with the display panel 4300. Herein, the switching unit 4310 may use the switching unit 120A or 120B of FIG. 1 or 2.

When the display panel 4300 is produced as described above, a touch controller and a display driving circuit may be integrated in one semiconductor chip 4330. When the touch controller and the display driving unit are integrated in the single semiconductor chip 4330, the semiconductor chip 4330 may include a first pad related to touch data and a second pad related to image and gradation data. The semiconductor chip 4330 may be connected through a conductive line 4320 to the touch sensing apparatus provided on the display panel 4300, and the touch controller integrated in the semiconductor chip 4330 may be connected through the conductive line 4320 to the switching unit 4310. As described above, since the touch controller integrated in the semiconductor chip 4330 is designed to be connected through the switching unit 4310 to touch sensors, the number of pads of the semiconductor chip 4330 is reduced.

Figure 26:
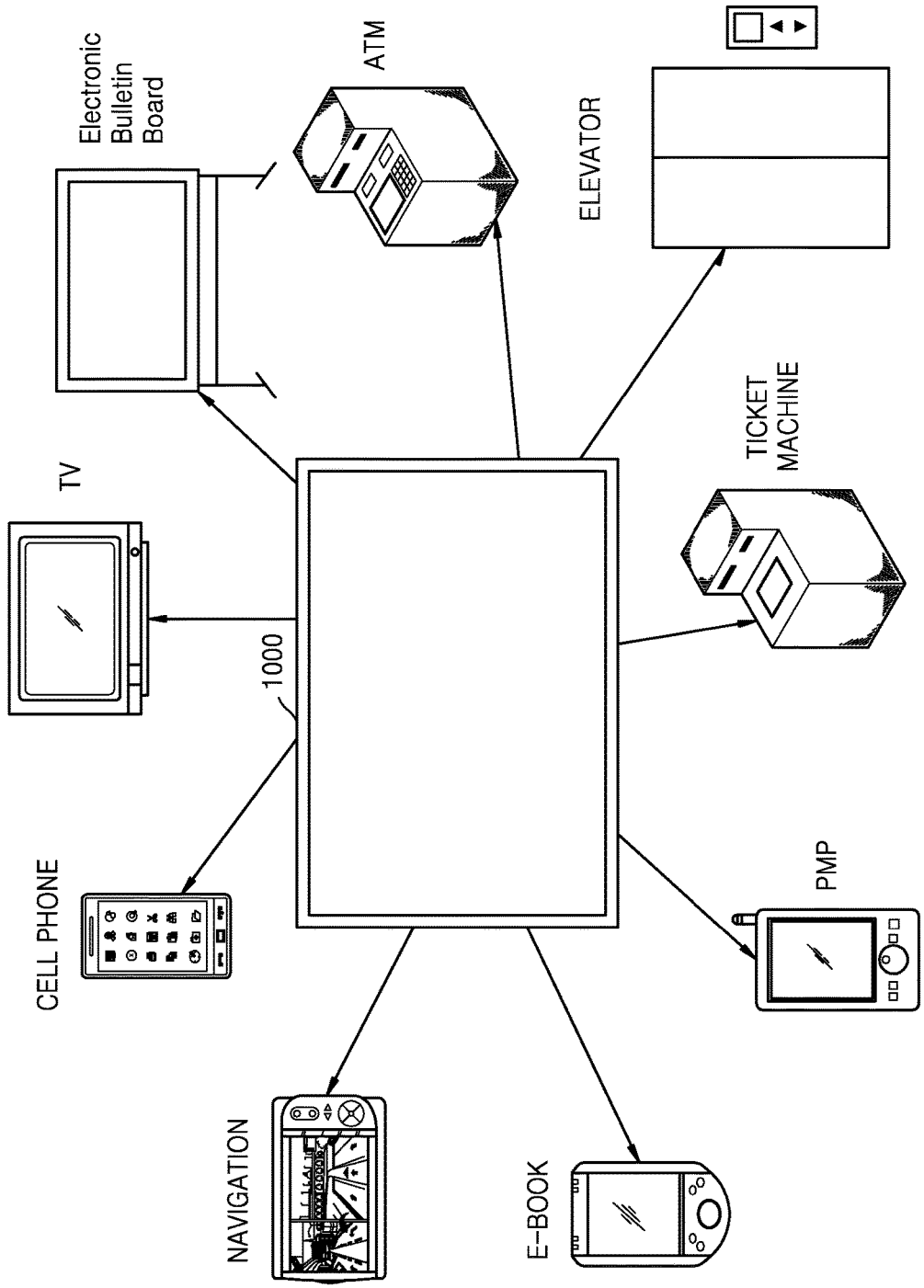
FIG. 26 is a diagram showing various examples of electronic products using a touch sensing system according to an embodiment of the disclosure.

FIG. 26 is a diagram showing various examples of electronic products using a touch sensing system 1000 according to an embodiment of the disclosure. The above-described touch sensing system 1000 according to an embodiment of the disclosure may be mounted in various electronic products. For example, the touch sensing system 1000 may use the touch sensing system 1000A or 1000B illustrated in FIG. 1 or 2.

The touch sensing system 1000 may be broadly used in mobile electronic devices such as cell phones, navigation systems, e-books, and portable media players (PMPs), fixed electronic devices such as ticket machines, elevators, and automated teller machines (ATMs), home appliances such as TVs and electronic bulletin boards, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. A touch sensing apparatus comprising:
a plurality of touch sensors provided in rows and columns of a touch panel such that no two of the touch sensors are arranged in both the same row, among the rows, and same column among the columns;
a switching circuit comprising a plurality of multiplexers, each of the multiplexers is individually connected to the touch sensors arranged in different columns/rows and receives sensing signals from the connected touch sensors; and
each of the multiplexers individually receives selection signals having the same values as each other and transmits only one sensing signal based on the selection signals at a time to a touch controller and the one sensing signal is communicated by the respective multiplexer to the touch controller through a respective single communication line, wherein
the switching circuit transmits the sensing signals corresponding to touch sensors in a selected row/column.

2. The touch sensing apparatus of claim 1, wherein:
the switching circuit comprises transistors individually connected to the touch sensors,
first terminals of the transistors are individually connected to the touch sensors,
second terminals of the transistors are connected to one pad per column or row of the touch sensors,
the pad is provided in an integrated circuit comprising the touch controller, and
gate terminals of the transistors receive selection signals.

3. The touch sensing apparatus of claim 2, wherein the selection signals comprise column-selection address signals or row-selection address signals.

4. The touch sensing apparatus of claim 2, wherein the transistors comprise thin film transistors.

5. The touch sensing apparatus of claim 1, wherein each of the multiplexers inputs sensing signals of touch sensors arranged in the same column and transmits a sensing signal of a touch sensor corresponding to a row, selected according to selection signals, through the respective single communication line to the touch controller.

6. The touch sensing apparatus of claim 5, wherein:
each of the multiplexers comprises transistors individually connected to the touch sensors arranged in the same column,
first terminals of the transistors are individually connected to the touch sensors arranged in the same column,
second terminals of the transistors are connected through one output terminal to the touch controller, and
gate terminals of the transistors receive the selection signals.

7. The touch sensing apparatus of claim 1, wherein each of the multiplexers inputs sensing signals of touch sensors arranged in the same row and transmits a sensing signal of a touch sensor corresponding to a column, selected according to selection signals, through the respective single communication line to the touch controller.

8. The touch sensing apparatus of claim 7, wherein:
each of the multiplexers comprises transistors individually connected to the touch sensors arranged in the same row,
first terminals of the transistors are individually connected to the touch sensors arranged in the same row,
second terminals of the transistors are connected through one output terminal to the touch controller, and
gate terminals of the transistors receive the selection signals.

9. The touch sensing apparatus of claim 1, wherein the touch sensors are in-cell type touch sensors provided in a display panel.

10. The touch sensing apparatus of claim 1, wherein the touch sensors are on-cell type touch sensors provided on a display panel.

11. The touch sensing apparatus of claim 1, wherein the touch sensors have an electrode array structure for sensing a position of a touch input based on at least one of a self-capacitance sensing scheme and a mutual-capacitance sensing scheme.

12. The touch sensing apparatus of claim 1, wherein:
the touch sensors comprise:
a first electrode array comprising a plurality of first electrodes; and
a second electrode spaced apart from and stacked over the first electrode array, and
an insulating material is provided between the first electrode array and the second electrode.

13. The touch sensing apparatus of claim 1, wherein:
each of the multiplexers is connected through path patterns to touch sensors arranged in the same column or row, and
dummy path patterns are added to the path patterns to achieve equal lengths of the path patterns.

14. The touch sensing apparatus of claim 1, wherein:
each of the multiplexers is connected through path patterns to touch sensors arranged in the same column or row, and
the path patterns for connecting the multiplexers to the touch sensors are configured to be symmetrical to each other in left and right regions of the columns or rows.

15. The touch sensing apparatus of claim 14, wherein dummy path patterns are added to the path patterns for connecting the multiplexers to the touch sensors to achieve equal lengths of the path patterns.

16. A touch sensing method comprising:
generating, by a touch controller, a driving signal to be supplied to a plurality of touch sensors provided in a touch panel, wherein the touch sensors are arranged in an array of rows and columns such that no two of the touch sensors are arranged in both the same row, among the rows, and same column among the columns;
selecting, with multiplexers, a touch sensor per column or row of the touch sensors and supplying the driving signal through a first signal line to the selected touch sensor; and
selecting, with the multiplexers, another touch sensor per column or row of the touch sensors and transmitting a selected sensing signal of the selected touch sensor according to the driving signal through a second signal line to the touch controller, wherein:
each of the multiplexers is individually connected to the touch sensors arranged in different columns/rows and receives sensing signals from the connected touch sensors,
each of the multiplexers receives selection signals having the same values as each other and transmits only one sensing signal based on the selection signals at a time to the touch controller and the one sensing signal is communicated by the respective multiplexer to the touch controller through a respective single communication line,
the multiplexers transmit the sensing signals corresponding to touch sensors in a selected row/column, and
a position of a touch input is determined based on an output according to the driving signal.

17. The touch sensing method of claim 16, wherein the first signal line and the second signal line connect a first terminal and a second terminal of one of the multiplexers to a first pad and a second pad of an integrated circuit comprising the touch controller, respectively.

18. A touch sensing apparatus comprising:
touch sensors arranged in rows and columns of a touch panel such that no two of the touch sensors are arranged in both the same row, among the rows, and same column among the columns; and
multiplexers, wherein:
each of the multiplexers is individually connected to the touch sensors arranged in different columns/rows and receives electrical sensing signals from the connected touch sensors,
each of the multiplexers individually receives selection signals having the same values as each other and transmits only one electrical sensing signal based on the selection signals at a time to a switch controller and the one electrical sensing signal is communicated by the respective multiplexer to the switch controller through a respective single communication line, and
the multiplexers transmit the electrical sensing signals corresponding to touch sensors in a selected row/column.

19. The touch sensing apparatus of claim 18, wherein, for each multiplexer, the one electrical sensing signal is selected by the multiplexer according to an address received by the multiplexer.

20. The touch sensing apparatus of claim 18, wherein:
if each of the multiplexers receives an electrical sensing signal from each touch sensor arranged within one of the rows, then each of the multiplexers simultaneously transmits, to the switch controller through the respective single communication line, an electrical sensing signal received from a different column of the same row in accordance with a received address that identifies the one row, and
if each of the multiplexers receives the electrical sensing signal from each touch sensor arranged within one of the columns, then each of the multiplexers simultaneously transmits, to the switch controller through the respective single communication line, an electrical sensing signal received from a different row of the same column in accordance with a received address that identifies the one column.

* * * * *